(12) United States Patent
Sharma et al.

(10) Patent No.: US 10,960,884 B2
(45) Date of Patent: Mar. 30, 2021

(54) DRIVELINE DISENGAGEMENT AND COASTING MANAGEMENT

(71) Applicant: Cummins Inc., Columbus, IN (US)

(72) Inventors: Oruganti Prashanth Sharma, Mountain View, CA (US); Kenneth M. Follen, Greenwood, IN (US); Tejas Shrikant Kinjawadekar, Mountain View, CA (US); Vivek Anand Sujan, Columbus, IN (US); Daniel Reed Dempsey, Columbus, IN (US); Apurva Chunodkar, Greenwood, IN (US); Nathanael G. Long, Avon, IN (US); Jairo Andres Sandoval Leon, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 16/898,580

(22) Filed: Jun. 11, 2020

(65) Prior Publication Data

US 2020/0346649 A1 Nov. 5, 2020

Related U.S. Application Data

(63) Continuation of application No. 15/963,435, filed on Apr. 26, 2018, now Pat. No. 10,717,440, which is a (Continued)

(51) Int. Cl.
*B60W 30/18* (2012.01)
*B60W 10/06* (2006.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC ...... B60W 10/02; B60W 10/06; B60W 30/14; B60W 30/143; B60W 30/18;
(Continued)

(56) References Cited

U.S. PATENT DOCUMENTS

| 5,594,645 A | 1/1997 | Nishimura et al. |
| 8,494,737 B2 | 7/2013 | Maier et al. |

(Continued)

FOREIGN PATENT DOCUMENTS

| WO | 2013095237 | 6/2013 |
| WO | 2013095239 | 6/2013 |

(Continued)

OTHER PUBLICATIONS

Search Report and Written Opinion, PCT Appln. No. PCT/US2016/60548, dated Nov. 11, 2016, 12 pgs.

(Continued)

*Primary Examiner* — Edwin A Young
(74) *Attorney, Agent, or Firm* — Taft Stettinius & Hollister LLP

(57) ABSTRACT

A system, method, and apparatus include a controller structured to predict a change in speed of a vehicle in advance of upcoming terrain and inhibit a coasting event if the speed exceeds a limit. In one form a velocity of the vehicle is predicted using a physics based model of the vehicle within a look ahead window in front of a vehicle. Such a look ahead window can be distance or time based. In another, speed of a vehicle is monitored during a coasting event and is compared against a threshold to determine whether to remain coasting or re-engage an engine to a driveline. The threshold is a function of road grade, and permits a larger deviation from set speed at low grade than at high grade. The function can be based on road grade and vehicle weight.

20 Claims, 13 Drawing Sheets

Related U.S. Application Data continuation of application No. PCT/US2016/060548, filed on Nov. 4, 2016.

(60) Provisional application No. 62/260,920, filed on Nov. 30, 2015, provisional application No. 62/250,747, filed on Nov. 4, 2015.

(51) Int. Cl.
*B60W 50/00* (2006.01)
*B60W 10/02* (2006.01)
*B60W 50/06* (2006.01)

(52) U.S. Cl.
CPC ........ *B60W 50/0097* (2013.01); *B60W 50/06* (2013.01); *B60W 2030/1809* (2013.01); *B60W 2520/10* (2013.01); *B60W 2552/15* (2020.02); *B60W 2552/20* (2020.02); *B60W 2710/021* (2013.01); *B60W 2710/06* (2013.01); *B60W 2720/103* (2013.01); *Y02T 10/60* (2013.01)

(58) Field of Classification Search
CPC . B60W 30/18072; B60W 2030/18081; B60W 2030/1809; B60W 2510/0216; B60W 2510/0647; B60W 2520/10; B60W 2530/10; B60W 2552/15; B60W 2552/20; B60W 2710/021; B60W 2720/103; F16D 48/06; F16D 2500/3107; F16D 2500/3108; F16D 2500/3127; F16D 2500/5085

See application file for complete search history.

(56) References Cited

U.S. PATENT DOCUMENTS

| | | | |
|---|---|---|---|
| 8,744,718 | B2 | 6/2014 | Johansson et al. |
| 2008/0026905 | A1 | 1/2008 | Dickinson |
| 2010/0185368 | A1 | 7/2010 | Schneider et al. |
| 2013/0261931 | A1 | 10/2013 | Hamane |
| 2014/0094344 | A1* | 4/2014 | Pedlar .................. B60W 10/06 477/174 |
| 2015/0039191 | A1 | 2/2015 | Cauthen |
| 2015/0088349 | A1 | 3/2015 | Akashi et al. |
| 2016/0121898 | A1* | 5/2016 | Jo .................. B60W 30/18072 701/22 |
| 2016/0167655 | A1* | 6/2016 | Minami .............. B60W 30/188 477/176 |

FOREIGN PATENT DOCUMENTS

| | | |
|---|---|---|
| WO | 2013095242 | 6/2013 |
| WO | 2014003652 | 1/2014 |
| WO | 2014003654 | 1/2014 |
| WO | 2014011105 | 1/2014 |

OTHER PUBLICATIONS

International Preliminary Report on Patentability, PCT Appln No. PCT/US2016/60548, dated Mar. 7, 2018, 9 pgs.

* cited by examiner

DRIVELINE DISENGAGEMENT AND COASTING MANAGEMENT

CROSS-REFERENCE TO RELATED APPLICATIONS

The present application is a continuation of U.S. application Ser. No. 15/963,435 filed Apr. 26, 2018, which is a continuation of International Patent Application No. PCT/US16/60548 filed on Nov. 4, 2016, which claims the benefit of the filing date of U.S. Provisional Application No. 62/250,747 filed on Nov. 4, 2015, and U.S. Provisional Application No. 62/260,920 filed on Nov. 30, 2015, each of which is incorporated herein by reference in its entirety for all purposes.

TECHNICAL FIELD

The present application also relates generally to management of coasting in a vehicle for fuel economy improvement, and more particularly to idle coasting management of a vehicle with a transmission.

BACKGROUND

Improved fuel economy for vehicles can be obtained by allowing the vehicle to coast during certain operating and drive cycle conditions. However, these benefits are not heretofore realized with all vehicles, such as those with transmissions, where the operator has control over the gear selection. Therefore, there remains a significant need for the apparatuses, methods and systems disclosed herein.

SUMMARY

One example of a system, method, and apparatus includes a coasting management controller that is configured to predict whether speed will exceed a limit in a look ahead window if an engine is disengaged from a driveline. Another includes a transmission that is configured to automatically allow the vehicle to coast with the engine disengaged from the driveline at certain drive cycle conditions. Whether the engine remains disengaged from the driveline depends on monitoring speed of vehicle and comparing it against a cancellation delta that can be determined as a function of road grade.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

DETAILED DESCRIPTION OF ILLUSTRATIVE EMBODIMENTS

Figure 1:
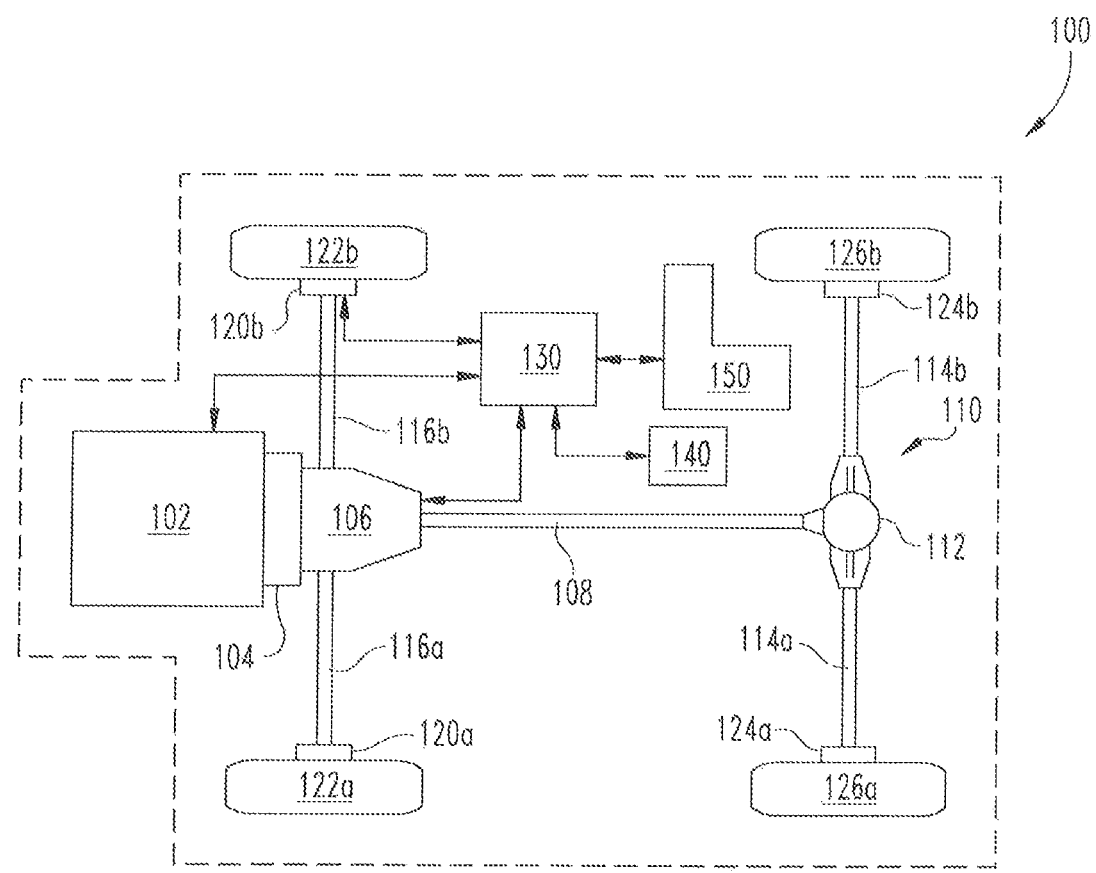
FIG. 1 is a schematic view of an example vehicle system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a schematic view of an example vehicle system 100 including an engine 102, such as an internal combustion engine, structured to generate power for the vehicle system 100. The vehicle system 100 further includes a clutch 104 operably connected to the engine 102 and a transmission 106 for adapting the output torque of the engine 102 via the clutch 104 and transmitting the output torque to a drive shaft 108. Vehicle system 100 illustrates a rear wheel drive configuration including a final drive 110 having a rear differential 112 connecting the drive shaft 108 to rear axles 114a, 114b. It is contemplated that the components of vehicle system 100 may be positioned in different locations throughout the vehicle system 100. In one non-limiting example, in a vehicle having a front wheel drive configuration, the transmission may be a transaxle and the final drive may reside at the front of the vehicle to connect front axles to the engine via the transaxle. It is contemplated that in some embodiments the vehicle may have an all-while drive configuration, and may additionally and/or alternatively be series electric, parallel electric, and pure electric. In some forms the vehicle may be without a transmission/final drive.

In the illustrated embodiment, vehicle system 100 further includes two front brakes 120a, 120b each positioned between and operably connected to two front wheels 122a, 122b and front axles 116a, 116b, respectively. Vehicle system 100 further includes two rear brakes 124a, 124b each positioned between two rear wheels 126a, 126b and rear axles 114a, 114b, respectively. It is contemplated that vehicle system 100 may have more or fewer tires and/or brakes than illustrated in FIG. 1. In certain embodiments, vehicle system 100 may also include various components not shown, such as a fuel system including a fuel tank, a braking system, an engine intake system, and an engine exhaust system, which may include an exhaust aftertreatment system, to name a few examples.

Vehicle system 100 further includes an electronic or engine control unit (ECU) 130, sometimes referred to as an electronic or engine control module (ECM), or the like, which is directed to regulating and controlling the operation of engine 102. In the illustrated embodiment, the ECU 130 includes a transmission control unit (TCU) directed to the regulation and control of transmission 106 operation. A combined ECU 130 and TCU into a single control module may be referred to as a powertrain control module (PCM) or powertrain control unit (PCU), or the like. ECU 130 is in electrical communication with a plurality of vehicle sensors (not shown) in vehicle system 100 for receiving and transmitting conditions of vehicle system 100, such as temperature and pressure conditions, for example. It is contemplated that in certain embodiments ECU 130 may be integrated within the engine 102 and/or the TCU integrated within the transmission 106. Other various electronic control units for vehicle subsystems are typically present in vehicle system 100, such as a braking system electronic control unit and a cruise control electronic control unit, for example, but such other various electronic control units are not show in vehicle system 100 to preserve clarity.

The ECU 130 in the illustrated embodiment is further connected to a fuel storage tank 150, which is generally one component of a larger fuel delivery system. Other component typically included in a fuel system, including a fuel pump, fuel delivery conduit, and other fuel delivery components are not shown in vehicle system 100 to preserve clarity. ECU 130 is further operatively coupled with and may receive a signal from a fuel storage tank level sensor, not shown, operable to provide a signal indicating the level of fuel in the fuel storage tank 150. The fuel storage tank level sensor need not be in direct communication with fuel storage tank 150, and can be located at any position within vehicle system 100 that provides a suitable indication of applicable fuel level readings in fuel storage tank 150.

In the illustrated embodiment, vehicle system 100 further includes a vehicle speed management (VSM) controller 140 operably connected to the ECU 130 for receiving vehicle system 100 sensor data and conditions. It is contemplated that in certain embodiments the VSM controller 140 may be integrated into the ECU 130. The VSM controller 140 includes stored data values, constants, and functions, as well as operating instructions stored on a computer readable medium. It is further contemplated that in certain embodiments ECU 130 and VSM controller 140 may transmit data communication messages across a controller area network (CAN) bus, not shown.

The CAN bus is a vehicle bus standard message-based protocol designed to allow microcontrollers and devices to communicate with each other within the vehicle without a host computer. The CAN bus was initially designed specifically for automotive applications, though modern applications include aerospace, maritime, industrial automation, and medical equipment. It is contemplated that in certain embodiments an alternative vehicle bus protocol may be used, such as a vehicle area network (VAN) or one of the Society of Automotive Engineers (SAE) vehicle bus protocols, for example.

Any of the operations of example procedures described herein may be performed at least partially by the VSM controller 140. In certain embodiments, the controller includes one or more modules structured to functionally execute the operations of the controller. The description herein including modules emphasizes the structural independence of the aspects of the VSM controller 140, and illustrates one grouping of operations and responsibilities of the VSM controller 140. Other groupings that execute similar overall operations are understood within the scope of the present application. Modules may be implemented in hardware and/or instructions stored on a non-transient computer readable medium, and modules may be distributed across various hardware or instructions stored on a non-transient computer readable medium. More specific descriptions of certain embodiments of controller operations are included in the section referencing FIG. 2. Operations illustrated are understood to be example only, and operations may be combined or divided, and added or removed, as well as re-ordered in whole or part, unless stated explicitly to the contrary herein.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, by receiving a value by which the interpreted parameter can be calculated, and/or by referencing a default value that is interpreted to be the parameter value. Furthermore, it is contemplated that the term sensor as used herein may include a virtual sensor, which may determine a condition directly and/or based on other data.

Figure 2:
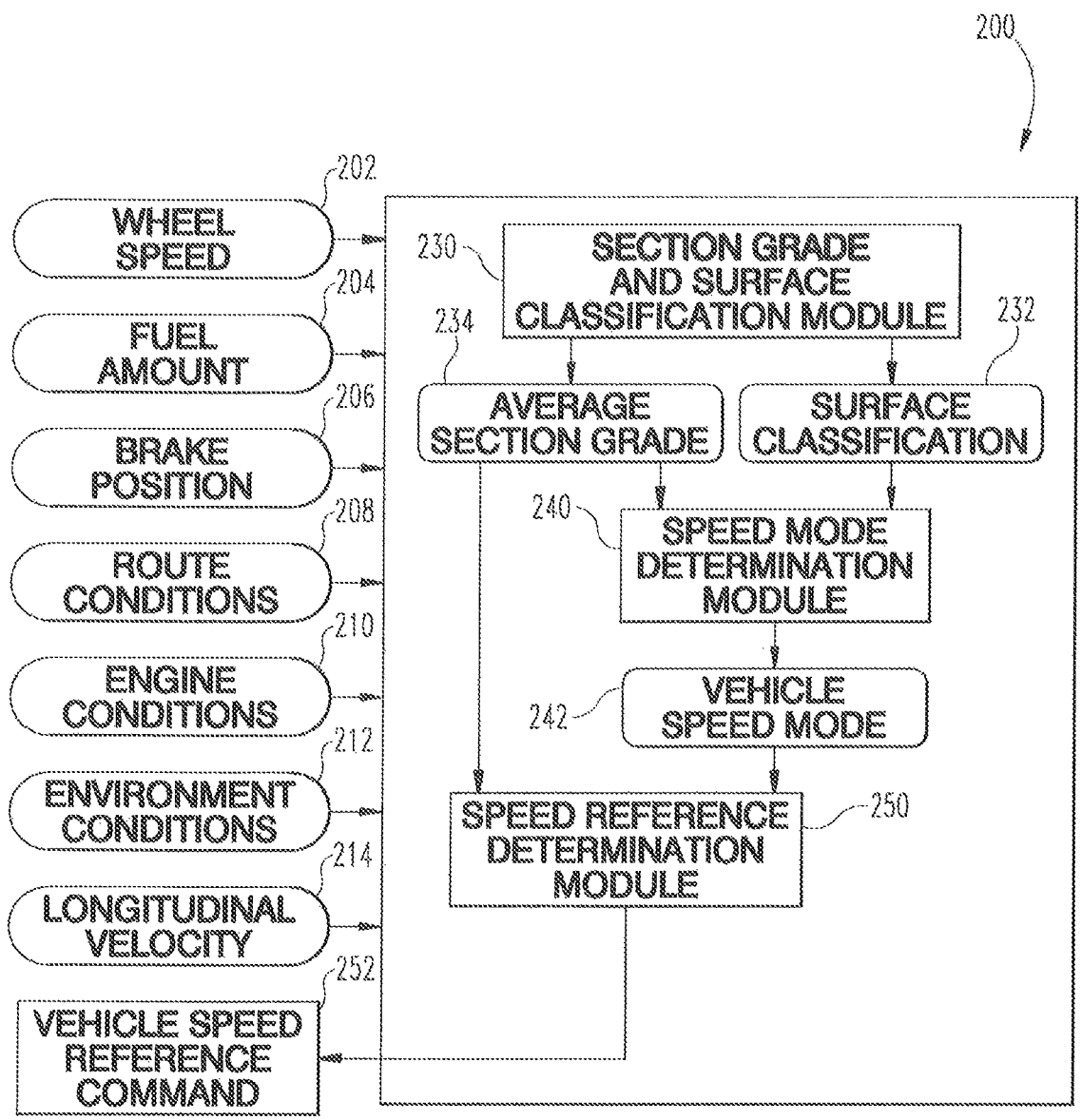
FIG. 2 is a schematic block diagram illustrating an example controller for determining a vehicle speed reference.

One example embodiment 200 of the VSM controller 140 is shown in FIG. 2. In certain embodiments, the VSM controller 140 includes a wheel speed input 202 determined from a wheel speed sensor (alternatively and/or additionally a vehicle speed sensor signal), a fuel amount input 204 determined from the fuel storage tank level sensor, and a brake position input 206 from a brake sensor operable to provide a signal indicating the brake position of any and/or all brakes 120a, 120b, 124a, and 124b in vehicle system 100. VSM controller 140 may further include a route conditions input 208, an engine conditions input 210, an environmental conditions input 212, and a vehicle longitudinal velocity input 214 which may be calculated and/or estimated using one or more vehicle sensors.

The route conditions input 208 may include at least one of a route grade (e.g., elevation changes of the route), an elevation, a speed limit minimum, a speed limit maximum, a route trip time, a traffic condition, a stop location and maximum and minimum acceptable speed deviations from a cruise set point. In certain embodiments, one or more of the route condition inputs 208 may be determined from a navigation and positioning device, such as a global position system (GPS) device, an electronic horizon device, and/or route data previously stored in memory. The engine conditions input 210 may include an ambient air pressure input, an ambient air temperature input, an engine throttle position input, an engine speed input, maximum and minimum available engine out torque, a vehicle mass, and in some forms an engine torque input determined from one or more engine 102 and/or engine intake system sensors. The environmental conditions input may include a wind input, a precipitation condition, an altitude input, and/or a relative humidity input, an indication of current traffic conditions or proximity to adjacent vehicles each of which may be determined using the one or more vehicle sensors in vehicle system 100 or communicated to the vehicle through vehicle to vehicle or vehicle to server techniques.

The VSM controller 140 illustrated in FIG. 2 includes a section grade and surface classification module 230, a speed mode determination module 240, and a speed reference determination module 250. Other VSM controller 140 arrangements that functionally execute the operations of the VSM controller 140 are contemplated in the present application.

The section grade and surface classification module 230 receives and interprets the route grade and divides the route grade into one or more sections based on a predetermined section length. The section grade and surface classification module 230 further determines an average grade 234 over at least a portion of the one or more sections and a surface classification 232 for each of the one or more sections. An example section grade and surface classification module 230 determines the surface classification 232 for each section based on each section's grade over the predetermined section length and a grade percentage threshold for each classification. Each section may be classified as one of an uphill surface when the section grade has a positive grade greater than or equal to an uphill surface percentage threshold, a downhill surface when the section grade has a negative grade less than or equal to a downhill surface percentage threshold, or a flat surface when the section grade has a positive grade less than uphill surface percentage threshold or a negative grade greater than the downhill surface percentage threshold.

The speed mode determination module 240 receives and interprets the surface classification 232 for each section and the average grade 234 to determine a vehicle speed mode 242 (e.g., a speed mode of a vehicle operating with an active cruise control set point). An example speed mode determination module 240 may determine each section as being one of a cruise speed mode (i.e., return to or maintain a cruise speed that may be defined by the operator of the vehicle), a pre-uphill speedup speed mode (i.e., speed up before entering an upcoming uphill surface), an uphill slowdown speed mode (i.e., slow down during a hill surface), a pre-downhill slowdown speed mode (i.e., slow down before entering an upcoming downhill surface), and a downhill speedup speed mode (i.e., speed up during a downhill surface).

The speed reference determination module 250 receives and interprets the surface classification 232 and the average grade 234 to determine a vehicle speed reference command 252. In certain embodiments, the speed reference determination module 250 further determines the vehicle speed reference based on at least one of the wheel speed input 202, the fuel amount input 204, the brake position input 206, the route conditions input 208, the engine conditions input 210, the environment conditions input 212, and the vehicle longitudinal velocity 214. In certain embodiments, the speed reference determination module 250 is configured to provide the vehicle speed reference command 252 to one or more vehicle speed regulators and/or one or more output devices. In certain embodiments, the vehicle speed reference command 252 provided to the one or more vehicle speed regulators may include one or more of a brake actuator position command, a throttle actuator position command, a torque command, a transmission gear ratio command, a fuel injection command, a final drive selection command, a cruise control speed setting command, and/or a requested speed command. In certain embodiments, the one or more output devices configured to receive the vehicle speed reference command 252 may include a dashboard device, a printer, a handheld or mobile device, a public datalink, a device in operative communication with a public datalink, a private datalink, a device in operative communication with a private datalink, a non-transient memory storage location, a non-transient memory buffer accessible to a datalink, a remote network, a device in operative communication with a remote network, and/or a like device capable of displaying an indication of the vehicle speed reference command 252.

A non-limiting example includes the speed reference determination module 250 configured to provide the vehicle speed reference command 252 to an output device which is a non-transient memory storage location. The vehicle speed reference command 252 is read from the non-transient memory storage location and utilized to adjust a speed reference for a vehicle, for example as a cruise control set speed adjustment.

Another non-limiting example includes the speed reference determination module 250 configured to provide the vehicle speed reference command 252 to an output device which is a public datalink, a device in operative communication with a public datalink, a private datalink, a device in operative communication with a private datalink, and/or a non-transient memory buffer accessible to a datalink. The vehicle speed reference command 252 is read from the datalink and/or the datalink buffer and provided to a location visible to a vehicle operator, such as a dashboard display or other visible location.

Yet another non-limiting example includes the speed reference determination module 250 configured to provide the vehicle speed reference command 252 to an output device which is a remote network and/or a device in operative communication with a remote network. The communication to the remote network may pass through intermediate communications, such as through a public or private datalink. The vehicle speed reference command 252 in the example is read from the remote network, and provided to a location visible to one of a vehicle operator and/or a fleet operator. An example includes a smart phone or mobile device providing the vehicle speed reference command 252 to the vehicle operator. Another example includes a remote device, such as a smart phone, laptop, desktop, or mobile device, providing the vehicle speed reference command 252 to the fleet operator. The fleet operator may adjust a vehicle speed reference, either remotely or in a calibration event at a later time—for example for vehicles that will be traveling on the route the current vehicle is traveling on, and/or the fleet operator may utilize the vehicle speed reference command 252 in future fleet planning operations. The described examples are non-limiting, and the inclusion of an example should not be considered to limit potential operations of devices or parameters that are either utilized in the examples or omitted from the examples.

Figure 3:
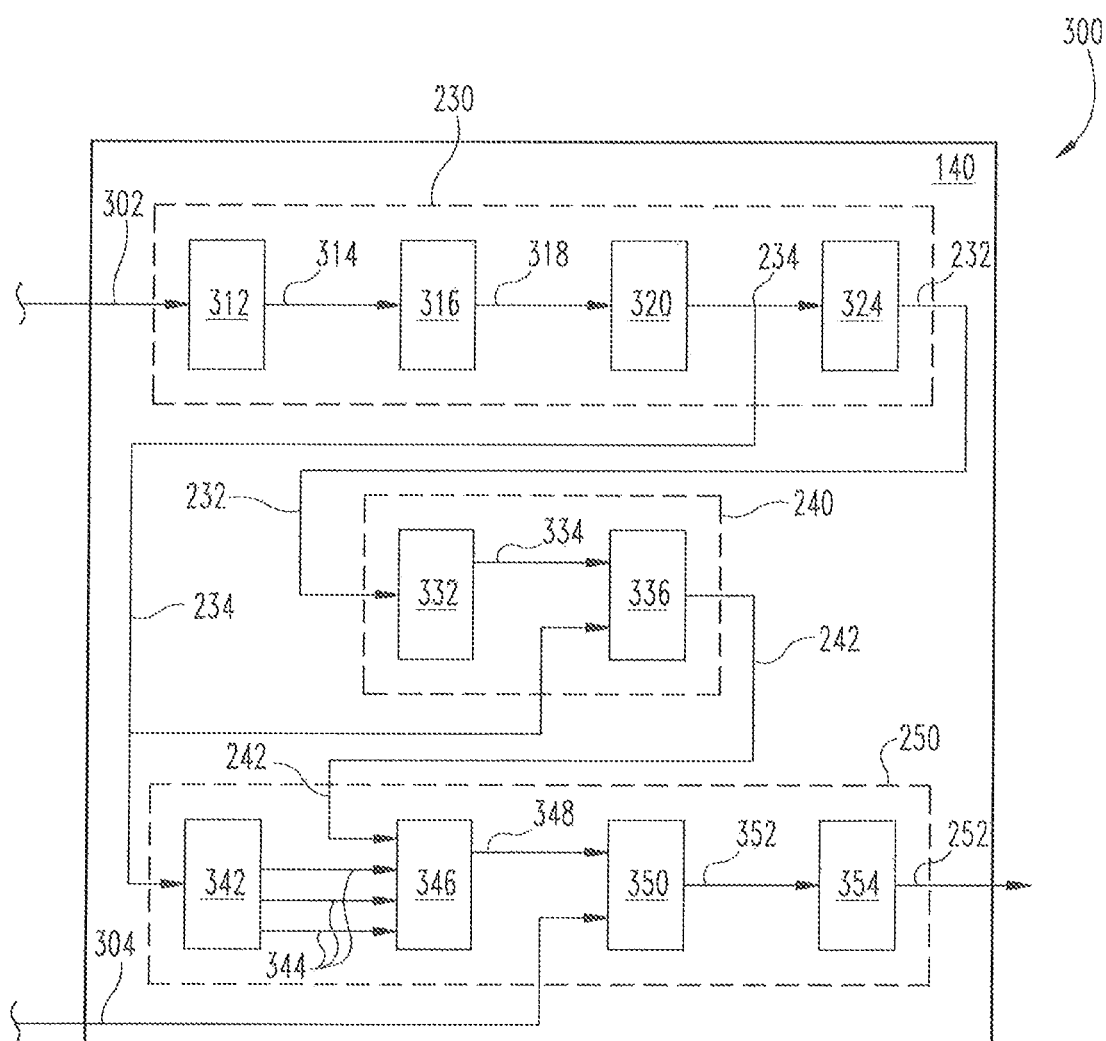
FIG. 3 is a schematic block diagram illustrating an example controller for determining a vehicle speed reference.

FIG. 3 illustrates another example embodiment 300 of the VSM controller 140. FIGS. 4-7 illustrate example embodiments of the input and output signals of the embodiment 300 to and from the VSM controller 140, respectively. With reference to FIG. 3, the VSM controller 140 receives a route grade signal 302 and a current velocity input 304.

Figure 4:
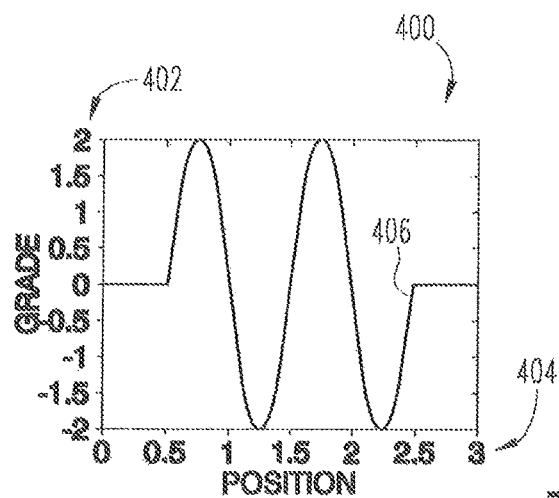
FIG. 4 is a line chart illustrating an example route grade signal input.

The route grade signal 302 is provided to the section grade and surface classification module 230. A non-limiting example of the route grade signal 302 is illustrated in FIG. 4. The route grade signal 302 may contain data for an entire route the vehicle will be travelling during a route trip. It is contemplated that in certain embodiments only a portion of the entire route may be provided to the section grade and surface classification module 230, with a different portion of the entire route being provided at different intervals throughout the route trip. In one non-limiting example, the route grade may be provided in two mile length increments. It is further contemplated that additional inputs may be received and interpreted by the section grade and surface classification module 230 in addition to or as an alternative to the route grade signal 302. Such signals may include an elevation signal, a route position signal, a speed limit signal, a traffic signal, signal indicating the proximity of adjacent vehicles, a wind signal, a road condition signal, a precipitation signal, an ambient pressure and/or temperature signal, a throttle position signal, a brake position signal, a fuel amount signal, an air/fuel ratio signal, an engine torque signal, and/or any derivative or second derivative of one of the signals which may be detected or calculated based on one or more sensors positioned throughout vehicle system 100.

In certain embodiments, the section grade and surface classification module 230 includes an elevation filtering module 312, a route grade sectioning module 316, a section grade averaging module 320, and a surface classification module 324. The elevation filtering module 312 outputs a filtered route grade 314 in response to the route grade signal 302 and a route grade filter. The filtered route grade 314 may be filtered by a zero phase shift low pass filter structured to reduce signal noise in the route grade. Different types of filters are contemplated, such as a high pass filter, a band pass filter, and a moving average filter, for example. It is further contemplated that other signals where noise is present in the signal may be filtered.

The route grade sectioning module 316 receives the filtered route grade 314 and sections of the filtered route grade 314 into a route sections output 318 based on the filtered route grade 314 and a section length, or resolution. In one non-limiting example, where the route grade provided is two miles in length and the section length is one-tenth of a mile, the route sections output 318 would be comprised of twenty route sections, each having a section grade and a length of one-tenth of a mile.

The section grade averaging module 320 receives the route sections output 318 and determines the average grade 234 based on each section grade of the route sections output 318 and the total number of route sections included in route sections output 318.

Figure 5:
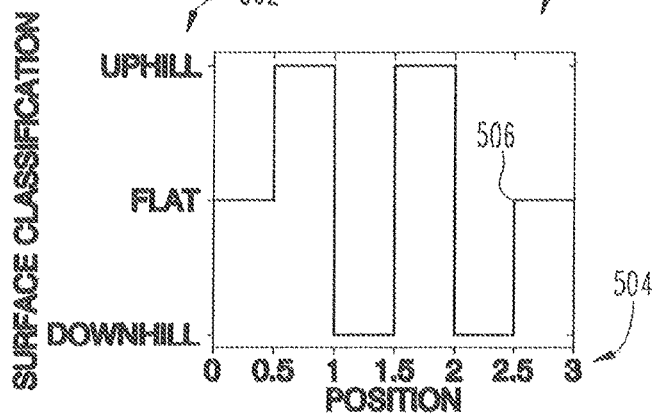
FIG. 5 is a line chart illustrating an example surface classification based on the route grade signal input of FIG. 4.

The surface classification module 324 receives the average grade 234 and determines a surface classification 232 for each route section. One non-limiting example of the surface classification 232 is illustrated in FIG. 5. An example surface classification module 324 determines the surface classification 232 for each route section based on each section grade and a classification threshold for each classification. In certain embodiments, each route section may be classified as one of the following surface classifications: an uphill surface, a downhill surface, and a flat surface. In one example non-limiting embodiment, the classification threshold may be a grade percentage. For example, when the section grade has a positive grade greater than an uphill surface percentage threshold, the route section may be classified as the uphill surface, when the section grade has a negative grade less than a downhill surface percentage threshold, the route section may be classified as the downhill surface, and when the section grade has a positive grade less than or equal to uphill surface percentage threshold or a negative grade greater than or equal to the downhill surface percentage threshold, the route section may be classified as the flat surface. In certain embodiments, it is contemplated that other thresholds may be used in addition to and/or alternatively to the grade percentage classification threshold, such as a hysteresis based threshold defined as a function of the current state, and/or determining a threshold using a search heuristic, such as a genetic algorithm, and/or adaptive control logic.

In certain embodiments, the speed mode determination module 240 includes a mode identification module 332 and a mode identification adjustment module 336. The mode selection system is provided the average grade 234 and the surface classification 232. The mode identification module 332 receives the surface classification 232 and determines a speed mode output 334 for each route section based on the surface classification 232. In certain embodiments, the speed mode output 334 may be based on a lookup table as a function of a current route section and a next route section. In certain embodiments, the current route section may be the route section from the route sections in which the vehicle is currently travelling in and the next route section may be the route section from the route sections in which the vehicle will be travelling in immediately following the current route section. An example mode identification module 332 may identify each route section as being one of a cruise mode (i.e., return to or maintain cruise speed set point), a pre-uphill speedup mode (i.e., speed up before entering the upcoming hill), an uphill slowdown mode (i.e., slow down during the hill), a pre-downhill slowdown mode (i.e., slow down before entering the upcoming downhill), and a downhill speedup mode (i.e., speed up during the downhill). In certain embodiments, it is contemplated that one or more additional modes may be used by the example mode identification module 332 to identify each route section, such as a no speed change mode and/or a coast mode, for example.

The mode identification adjustment module 336 receives the average grade 234 and the speed mode output 334 as inputs to determine and output the vehicle speed mode 242 to allow for a pre-hill adjustment length, which may be applied to each route section. In certain embodiments, the vehicle speed mode 242 may be based on a lookup table as a function of the current route section and the next route section, an example of which is further detailed in FIG. 8.

The current velocity input 304 is provided to the speed reference determination module 250. In the illustrated embodiment, the speed reference determination module 250 includes a speed mode selector module 346, a speed reference determination module 350, and a speed reference determination module 354. The speed reference determination module 250 further includes a piecewise linear parameter module 342 that receives the surface classification 232 for each route section and determines a speed modes output 344 for each route section based on the surface classification 232 for each route section. In certain embodiments, a piecewise linear function of route section distance and route section amplitude may be used to determine the speed mode for each route section. It is contemplated that in certain embodiments a nonlinear function, a polynomial function, an exponential function, a logarithmic function, a trigonometric function, a spline function, a constant function, and/or the like may be used in addition to and/or as an alternative to the piecewise linear function.

The speed mode selector module 346 receives the vehicle speed mode 242 and the speed modes output 344 to determine a current speed mode output 348 for the current route section. The current velocity input 304 and current speed mode output 348 are received by the speed reference determination module 350, which determines a speed reference output 352. In certain embodiments, speed reference output 352 may be determined utilizing the following equation:

$$V(i+1)=V(i)+a*dx \qquad \text{Equation 1}$$

wherein V is the velocity and a is the rate of change velocity with respect to distance. It is contemplated that the velocity values used in Equation 1 may be measured, calculated, and/or modeled. In certain embodiments, the average grade 234 may be used to further determine speed reference output 352.

The speed reference adjustment module 354 receives the speed reference output 352 and determines the vehicle speed reference command 252. The vehicle speed reference command 252 may include one or more vehicle speed references sent to one or more components of vehicle system 100. In one example, the vehicle speed reference command 252 may be a brake actuator position for a brake actuator in a braking system. Other non-limiting examples include a throttle actuator position, a transmission gear ratio, a final drive selection, a cruise control set point, a fueling command, a torque request, and/or a requested speed. The vehicle speed reference command 252 may be determined using an output limiting threshold, such as a rate limiting threshold and/or saturation threshold, for example.

Figure 6:
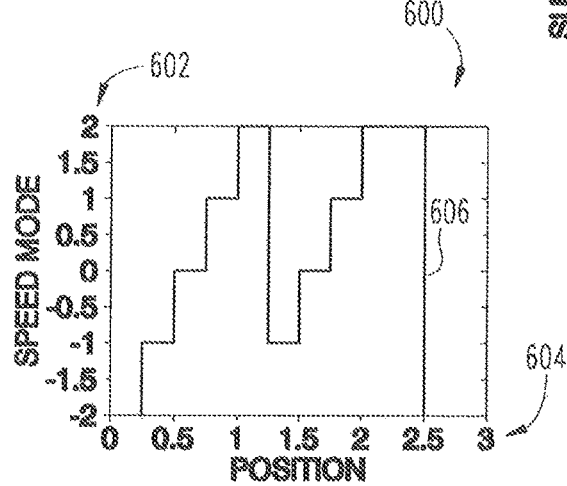
FIG. 6 is a line chart illustrating an example speed mode based on the surface classification of FIG. 5.
Figure 7:
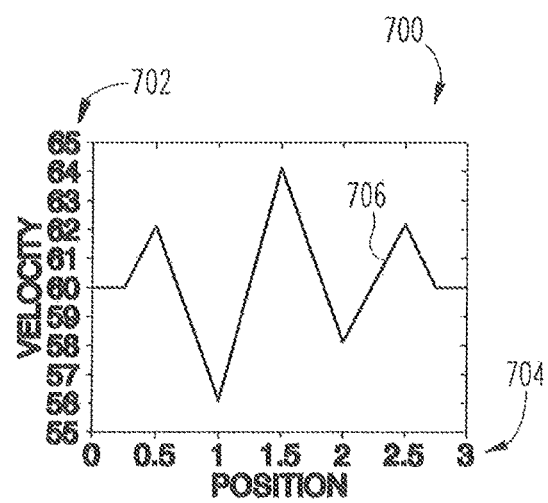
FIG. 7 is a line chart illustrating an example velocity based on the speed mode of FIG. 6.

As noted previous, FIGS. 4-7 illustrate example embodiments of the input and output signals of the embodiment 300 of the VSM controller 140. FIG. 4 illustrates a route grade line chart 400 having a grade variable Y-axis 402, a position variable X-axis 404, and a route grade signal 406. FIG. 5 illustrates a surface classification line chart 500 having a surface classification variable Y-axis 502, a position variable X-axis 504, and a surface classification signal 506. FIG. 6 illustrates a speed mode line chart 600 having a speed mode variable Y-axis 602, a position variable X-axis 604, and a speed mode signal 606. FIG. 7 illustrates a reference velocity line chart 700 having a velocity variable Y-axis 702, a position variable X-axis 704, and a reference velocity signal 706.

Figure 8:
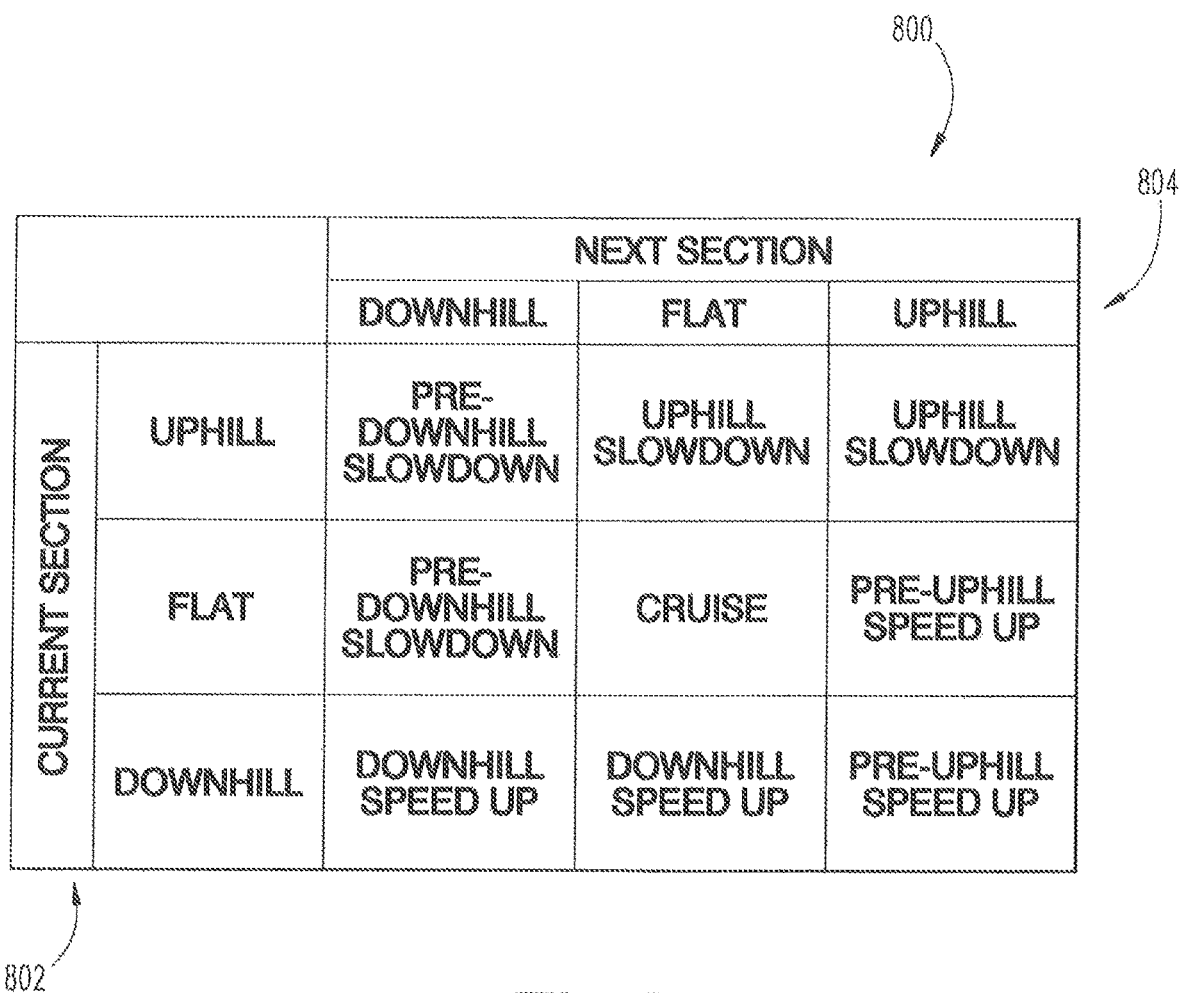
FIG. 8 is an example speed mode lookup table.

FIG. 8 illustrates an example speed mode lookup table 800 as a function of a current route section axis 802 and a next route section axis 804. Each route section axis 802, 804 includes each surface classification for mapping a current speed mode based on the current route section and the next route section. For example, when the current route section is classified as an uphill surface and the next route section is classified as a downhill surface, the current speed mode would be set to the pre-downhill slowdown mode. It is contemplated that different surface classifications and/or speed modes may be used in addition to or as an alternative to the surface classifications and speed modes illustrated in FIG. 8, in which case the speed mode lookup table axes 802, 804 may be modified to reflect the different surface classifications and/or speed modes.

Figure 9:
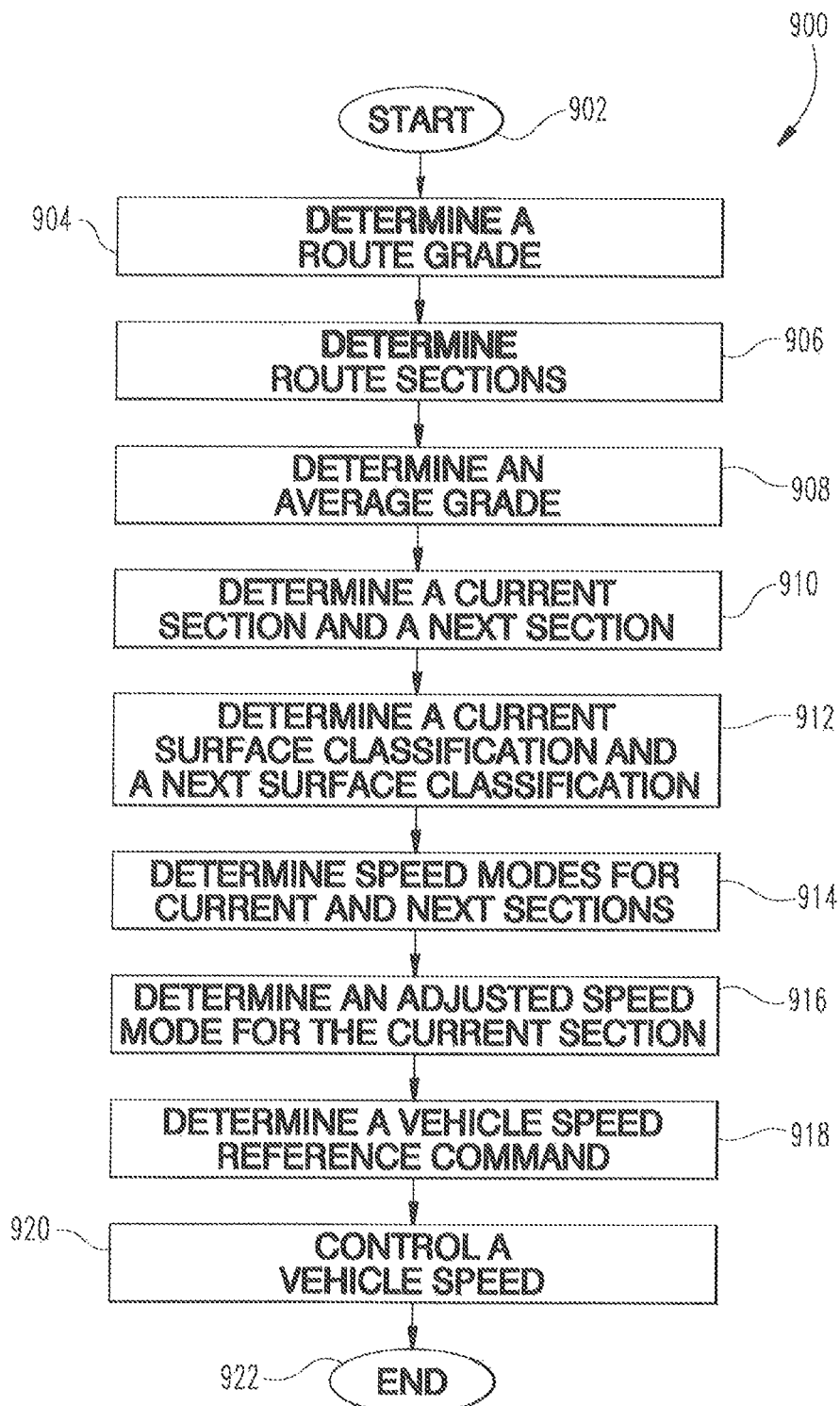
FIG. 9 is a flow diagram illustrating an example procedure for determining a vehicle speed reference.

With reference to FIG. 9, there is illustrated a flow diagram of an example procedure 900 for determining a vehicle speed reference. In certain embodiments the vehicle speed reference may be provided to a vehicle system, such as vehicle system 100, to control a vehicle speed for a vehicle in that is put into operation by programming the VSM controller 140 for use in, for example, vehicle system 100. In certain embodiments, the example procedure 900 may be used to control the vehicle speed of a vehicle operating in an active cruise control mode. In addition to or as an alternative to providing the vehicle speed reference to the vehicle system to control the vehicle speed, it is contemplated that in certain embodiments the vehicle speed reference may be provided to an output device for displaying an indication of the vehicle speed reference. Such output devices may include a dashboard device, a printer, a hand-held or mobile device, a public datalink, a device in operative communication with a public datalink, a private datalink, a device in operative communication with a private datalink, a non-transient memory storage location, a non-transient memory buffer accessible to a datalink, a remote network, a device in operative communication with a remote network, and/or a like device capable of displaying an indication of the vehicle speed reference. Procedure 900 begins at operation 902, in which a control routine is started for providing a route grade signal to VSM controller 140 to determine the vehicle speed reference. Operation 902 may begin by interpreting a key-on event, completion of a cycle, restarting procedure 900, or by initiation by the vehicle operator or a technician.

Procedure 900 continues to operation 904, where a route grade is determined based on the route grade signal. It is contemplated that in certain embodiments, the route grade may be for the entire route or a portion of the route. It is further contemplated that the route grade signal may be filtered, such as by a low pass filter, for example. Procedure 900 continues from operation 904 to operation 906, where route sections are determined based on the route grade signal and a route section length. It is contemplated that in certain embodiments the route section length may be a static length defined at the beginning of the route and/or a dynamic length that may be redefined throughout the route. Procedure 900 continues to operation 908, where an average grade is determined based on the route grade and the route section length. In certain embodiments a simple averaging function may be used. It is contemplated that in certain embodiments the average grade function may only use a portion of the route grade.

From operation 908, procedure 900 continues to procedure 910, where a current section and a next section are determined from the route sections determined at operation 906. Procedure 900 continues to operation 912, where each of the current and next sections are classified with a surface classification. It is contemplated that in certain embodiments a threshold may be used to reduce/remove signal chattering, or signal deviations, to determine the surface classification. In certain embodiments, the surface classification may include one of an uphill surface, a downhill surface, and/or a flat surface. Procedure 900 continues from operation 912 to operation 914, where a speed mode is determined for each of the current and next sections based on the surface classification for each section determined in operation 912. The speed mode for each section may be determined using a lookup table as a function of the current section surface classification and the next section surface classification. In certain embodiments the speed mode may include a cruise mode, a pre-uphill speedup mode, an uphill slowdown mode, a pre-downhill slowdown mode, and/or a downhill speedup mode.

From operation 914, procedure 900 continues to operation 916, where an adjusted speed mode for the current section is determined based on the current and next section speed modes determined in operation 914. Procedure 900 then continues to operation 918, where a vehicle speed reference command is determined. In certain embodiment, the vehicle speed reference command may be determined as a function of the current velocity, the average grade, and the current speed mode. Procedure 900 continues from operation 918 to operation 920, where a vehicle speed is controlled based on the vehicle speed reference command determined at operation 918. In certain embodiments, the vehicle speed reference command may include one or more vehicle speed reference commands sent to the ECU 130, another controller, and/or directly to one or more speed control components of vehicle system 100. The speed control components may include a brake actuator, a throttle actuator, a fuel injector, a transmission gear, a final drive, a cruise control system, and/or an engine request directed toward engine torque, for example. Procedure 900 is complete and ends at operation 922, where procedure 900 may be restarted such that the section after the next route section becomes the next route section and the previous next route section becomes the current route section. Procedure 900 may be repeated for the entire route grade signal.

Additionally and/or alternatively to the embodiments above, a coasting management controller can be provided that in some forms is incorporated into the VSM controller 140 and/or is a supplemental controller to any other controller used in the vehicle such as a conventional cruise controller (or can be a completely self-contained standalone controller). For that matter, the coasting management controller can include any necessary control modules described herein, such as but not limited to modules needed for hill classification, route/environment parameter processing, and a hook for communication with the TCU, as will be appreciated by those of skill in the art.

The coasting management controller 1000 can be structured to receive inputs such as the embodiment 200 depicted above in FIG. 2, as well as any number of other inputs, and output a control signal useful in the regulation of vehicle speed. In one form the coasting management controller can be used to manage disengagement of the engine 104 to the driveline 107 to provide for a controlled coasting event in light of upcoming road conditions, such as grade, speed limits, etc that are mentioned above and below, for example with respect to the section related modules and route related modules. The coasting management controller can be used to maintain disengagement of the engine 104 to driveline 107 so long as certain conditions are being met. The instant application describes techniques to inhibit the activation of a coasting event (and thus maintain engagement of the engine 104 to driveline 107) if certain conditions are not met.

Figure 10:
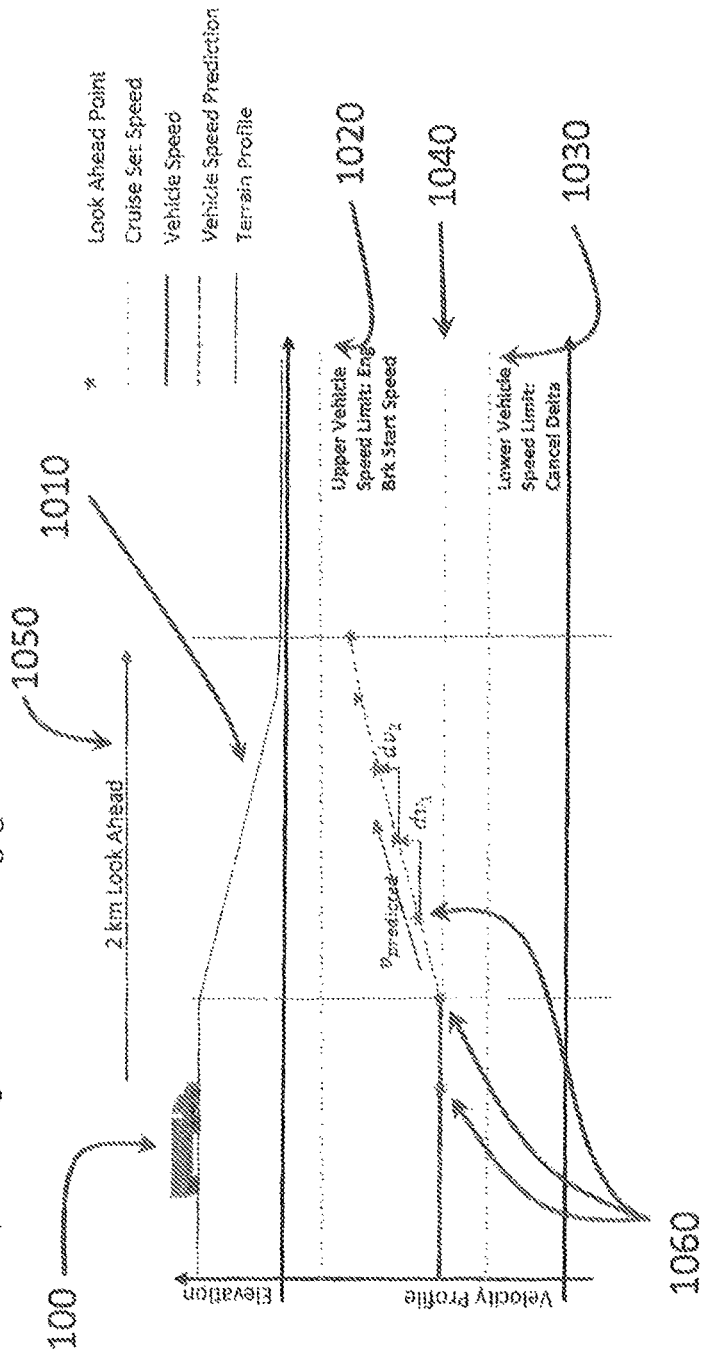
FIG. 10 depicts an embodiment of a coasting management controller determining whether predicted speed remains within limits.

Turning now to FIG. 10, one embodiment of the coasting management controller can be seen pictorially regulating the speed of a vehicle 100 as it approaches a descent via grade 1010 in a road, and determining whether to inhibit activation of a coasting event. It will be appreciated that the term "road" as used herein is intended to encompass improved and nonimproved throughways upon which a vehicle can be travelling. Thus, a gravel road or a dirt road can also be included, whether or not the road is specifically demarcated by a recognized edge such as a cleanly laid edge or marker. For example, a 'road' across a dry lake bed may very well be a path which may or may not have been previously travelled upon. Thus, the term 'road' and any other term that connotes a path upon which the vehicle is travelling is intended to reasonably encompass the above interpretation.

FIG. 10 depicts at the top the grade prior to heading downhill and various velocity related details of the vehicle movement plotted as a function of distance. The velocity related details include items such as: engine brake activation speed 1020, a "cancel delta" 1030 which relates to lower speed at which in one embodiment the coasting management controller will disengage if exceeded, a cruise set speed 1040 which relates to a speed at which the vehicle will be regulated during engagement of the coasting management controller.

As suggested in the figure, a look ahead-window 1050 is used in advance of the grade 1010 to predict vehicle speed if the engine 104 is disengaged from the driveline 107 during a coasting event. Speed is predicted at individual points 1060 in the look-ahead window 1050 using any variety of techniques. In one form speed at the individual points is predicted using a physics based model of the vehicle 100. In one such form, the physics based model takes into consideration the grade of the upcoming terrain (e.g. grade 1010). The grade is provided to a speed change procedure that is used to compute a change in speed of the vehicle as a result of a grade in the terrain upon which the vehicle is travelling. The grade of the upcoming terrain can in some forms be continuously updated in the controller as the vehicle travels upon the terrain. Such data can be provided via on-board memory calls, RF reception, electronic bus communications, inter-vehicle network communication, etc. The grade data can take any variety of forms.

For example, the grade data can be a look ahead vector in which each data point in the vector corresponds to a data point in a position vector (e.g. the position vector can represent evenly spaced data points at distance intervals in advance of the vehicle). Such a pairing of grade and positon vectors could represent a constantly updated data set as the vehicle travels along a road with both vectors representing look-ahead information. Not all datasets need include evenly spaced position data points.

Alternatively, the grade data can be a look ahead vector in which each data point in the vector corresponds to a data point in a time vector (e.g. the time vector can represent evenly spaced data points at future time intervals in advance of the vehicle). Such a pairing of grade and time vectors could represent a constantly updated data set as the vehicle travels along a road with both vectors representing look-ahead information. Not all datasets need include evenly spaced position data points.

The physics based model can be structured to produce a speed change of the vehicle denoted as dV. In one form a speed change module uses information such as power available from the engine, vehicle speed, vehicle mass, etc to predict a change in vehicle speed as a result of the grade. In one nonlimiting embodiment the change in speed can be represented as:

$$dV = (P_{eng} - P_{ss,cruise} - P_{grade})\frac{L}{m \cdot v^2}$$

Where dV represents the change in speed; $P_{eng}$ represents either the motoring power or the max power of the engine depending upon whether the grade is positive or negative; $P_{ss,cruise}$ represents the power required for the vehicle to maintain steady cruise set speed; L is the length of the grade segment, m is the mass of the vehicle, and v is vehicle speed; and $P_{grade}$ is the grade power (e.g. m*g*sin(grade angle)*v where the symbols are the same as elsewhere in the equation and g is gravity). Since a change in velocity is calculated when the driveline is disengaged, $P_{ss,cruise}$ can be set to 0 in the equation above.

In the illustrated embodiment in FIG. 10, the coasting management controller calculates speed at the individual points 1060 in the look ahead window 1050. The look ahead window 1050 is set at 2 km in the illustrated embodiment, but can be longer or shorter in other embodiments. The individual points 1060 are set at 200 m increments in the illustrated embodiments, but the increments can also take on other sizes (larger or smaller), and in some forms may not be evenly spaced throughout the look ahead window. In some forms the increments can be as low as 0.5 meters. In still other forms the increments can be between 0.5 meters and 200 m, such as 100 m to set forth just one non-limiting embodiment in this range.

In other embodiments in which the look ahead information is expressed in the time domain as suggested above, the spacing can be anywhere from 200 ms to 5 seconds, but the increments can also take on other sizes, and in some forms may not be evenly spaced throughout the look ahead window.

As suggested above, the increments and/or range used when expressing the look ahead window as a distance or as a time can be evenly spaced, but can also be unevenly spaced. Such an altered point resolution (e.g. longer or shorter distance or time steps in the window) can be based upon any number of conditions. For example, conditions such as grade (e.g. steeper grades could use smaller steps) or vehicle speed (higher speeds could use smaller steps) could influence the nature of the spacing between points across the look ahead. The altered point resolutions could be applied to all calculations (e.g. if the predicted route includes a steep grade, then change the size down) or change along a predicted route (e.g. shorter windows could be used where more rapid speed changes are expected). Determinations of the size of window and increment sizes within the window (whether time or distance based) can be made by considerations of contemplated grades, acceptable speed change amounts, processor throughput limitations, and available route prediction resolution values.

As mentioned above, the instant application includes techniques to inhibit the activation of a coasting event (and thus maintain engagement of the engine 104 to driveline 107) if certain conditions are not met; the corollary of which is that when those conditions are met the techniques described herein permit activation/request a coasting event. Such an ability to inhibit on the one hand or permit activation/request a coasting event on the other can be based upon a time or distance based look ahead window as discussed in the alternatives above, and in some forms can include a persistence counter of any size before inhibition and/or activation/request can be initiated. The coasting management controller uses the look ahead window 1050, and in particular the predicted speed at the points 1060 in the look ahead window, to determine whether predicted speed given the grade 1010 will remain within vehicle speed limits 1020 and 1030. As shown in FIG. 10, the predicted velocity at each of the points 1060 remains within the upper limit 1020 and the lower limit 1030. Thus, the coasting management controller will not inhibit the disengagement of the engine 104 to the driveline 107 (e.g. in some forms it can request the initiation of a coasting event) in the embodiment shown in FIG. 10.

The upper limit 1020 and/or the lower limit 1030 can be preset limit fixed for the duration of operation of the coasting management controller, but in some forms the limits can vary depending on any number of factors, whether based on real-time feedback of road conditions, and/or taken from a calibration table. In one form the speed limits 1020 and/or 1030 are calibratable thresholds over a calibratable distance.

Figure 11:
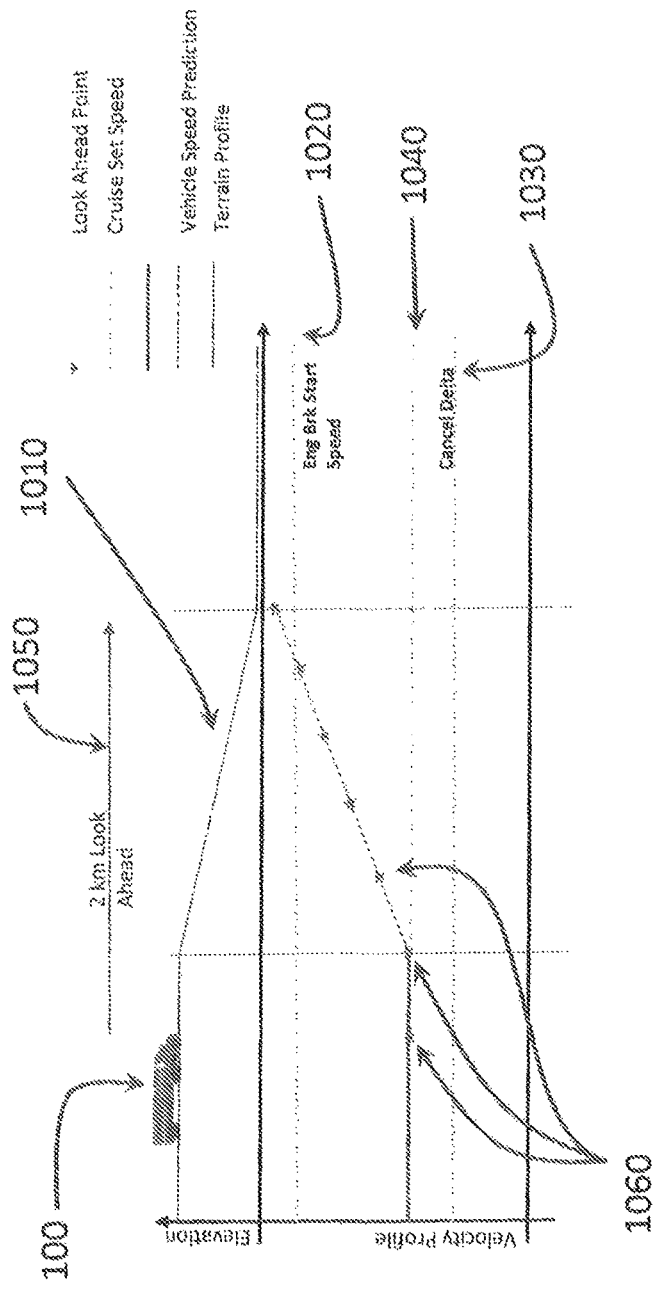
FIG. 11 depicts an embodiment of a coasting management controller determining that predicted speed falls outside of prescribed limits.

FIG. 11 depicts one example of a grade 1010 that produces a predicted speed in excess of the limit 1020. In the illustration of FIG. 11, predicted speed exceeds the limit 1020 at the last point 1060 in the look ahead window 1050. In this example, the coasting management controller will inhibit disengagement of the engine 104 from the driveline 107 (it will not request a coasting event) since predicted speed will exceed a limit at some point in the look ahead window 1050.

Figure 12:
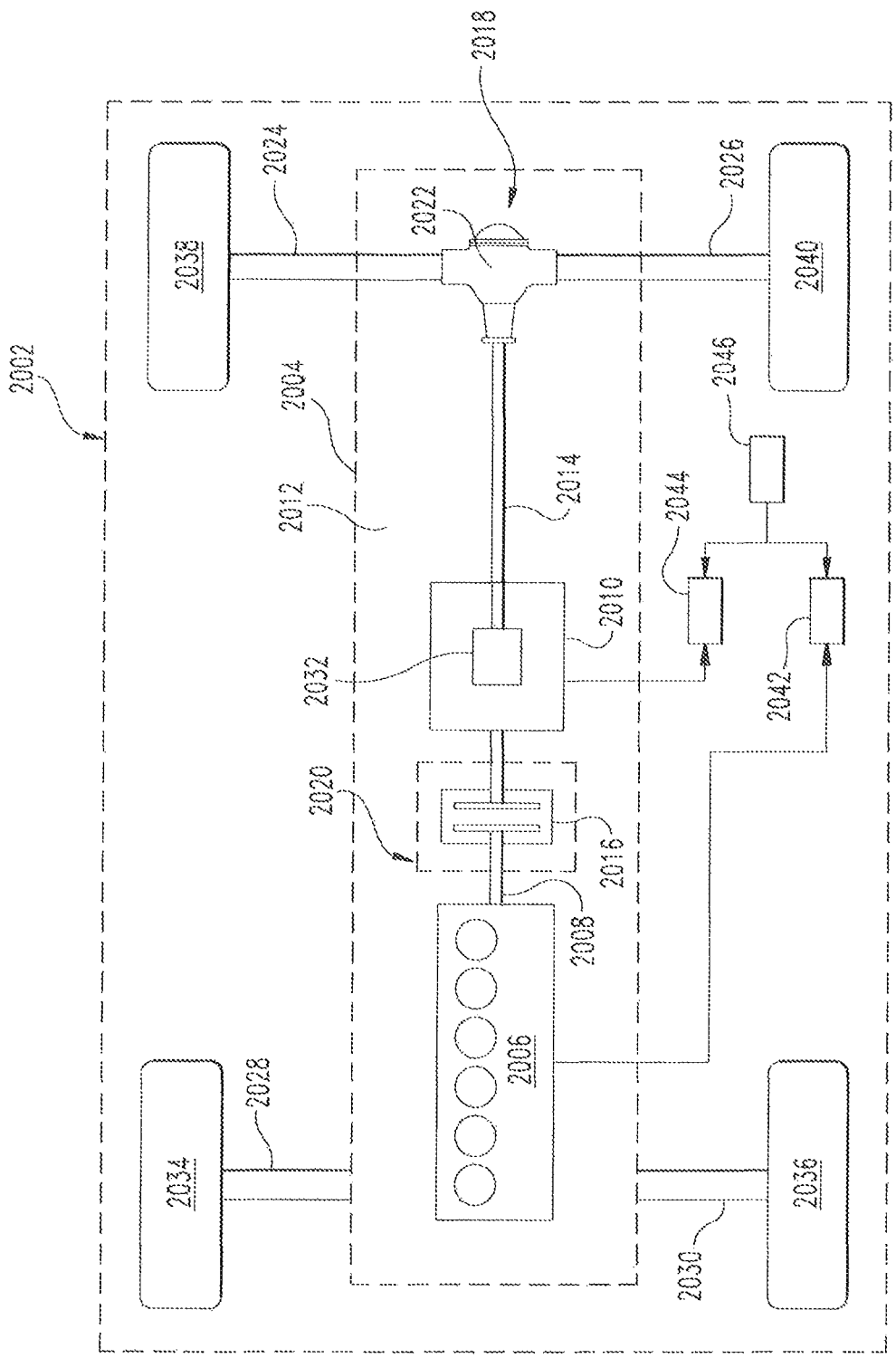
FIG. 12 is a schematic illustration of a vehicle with a controllable transmission for coasting management of the vehicle.

With reference to FIG. 12, there is illustrated a schematic view of an exemplary vehicle 2002 including a powertrain 2004 incorporated within vehicle 2002. In the illustrated embodiment, the powertrain 2004 includes an engine 2006, such as an internal combustion engine, structured to generate power for the vehicle 2002. The powertrain 2004 further includes a transmission 2010 connected to the engine 2006 for adapting the output torque of the engine 2006 and transmitting the output torque to a driveline 2012 including drive shaft 2014. In certain embodiments, the transmission 2010 is a transmission that may be disengageably connected to an engine crankshaft 2008 via a clutch 2016. The transmission can be any one of different transmission types. To set forth just a few non-limiting embodiments, the transmission can be an AMT (automated manual transmission), CVT (continuously variable transmission), manual transmission, etc.

In the rear wheel drive configuration illustrated for vehicle 2002, the driveline 2012 of powertrain 2004 includes a final drive 2018 having a rear differential 2022 connecting the drive shaft 2014 to rear axles 2024, 2026. It is contemplated that the components of powertrain 2004 may be positioned in different locations throughout the vehicle 2002. In one non-limiting example of a vehicle 2002 having a front wheel drive configuration, transmission 2010 may be a transaxle and final drive 2018 may reside at the front of the vehicle 2002, connecting front axles 2028 and 2030 to the engine 2006 via the transaxle. It is also contemplated that in some embodiments the vehicle 2002 is in an all-wheel drive configuration.

In the illustrated embodiment, vehicle 2002 includes two front wheels 2034, 2036 mounted to front axles 2028, 2030, respectively. Vehicle system 2002 further includes two rear wheels 2038, 2040 mounted to rear axles 2024, 2026, respectively. It is contemplated that vehicle 2002 may have more or fewer wheels than illustrated in FIG. 12. Vehicle 2002 may also include various components not shown, such as a fuel system including a fuel tank, a front differential, a braking system, a suspension, an engine intake system and an exhaust system, which may include an exhaust aftertreatment system, to name a few examples.

Vehicle 2002 includes an electronic or engine control unit (ECU) 2042, sometimes referred to as an electronic or engine control module (ECM), or the like, which is directed to regulating and controlling the operation of engine 2006. A transmission control unit (TCU) 2044 is illustrated in vehicle 2002, which is directed to the regulation and control of transmission 2010 operation. ECU 2042 and TCU 2044 are each in electrical communication with a plurality of vehicle sensors (not shown) in vehicle 2002 for receiving and transmitting conditions of vehicle 2002, such as temperature and pressure conditions, for example. In certain embodiments, the ECU 2042 and the TCU 2044 may be combined into a single control module, commonly referred to as a powertrain control module (PCM) or powertrain control unit (PCU), or the like. It is contemplated that ECU 2042 and/or TCU 2044 may be integrated within the engine 2006 or transmission 2010, respectively. Other various electronic control units for vehicle subsystems are typically present in vehicle system 2002, such as a braking system electronic control unit and a cruise control electronic control unit, for example, but such other various electronic control units are not show in vehicle 2002 to preserve clarity.

Vehicle system 2002 further includes a cycle efficiency management (CEM) module 2046, which may be directed to the control of the operations described herein and/or directed toward an intermediary control for the regulation and control of the powertrain 2004 in vehicle system 2002. In the illustrated embodiment, CEM module 2046 is in electrical communication with each of the ECU 2042 and TCU 2044. In certain embodiments, at least a portion of the CEM module 2046 may be integrated within the ECU 2042 and/or TCU 2044. CEM module 2046 may further be in electrical communication with one or more of the plurality of vehicle sensors in vehicle 2002 for receiving and transmitting conditions of vehicle 2002, such as temperature and pressure conditions, route conditions, terrain conditions, speed conditions, and weather conditions, for example. It is contemplated that at least a portion of the conditions and/or measured inputs used for interpreting signals by the CEM module 2046 may be received from ECU 2042 and/or TCU 2044, in addition to or alternatively to the plurality of vehicle sensors. Furthermore, the CEM module 2046 may include a processor or controller and be a control unit.

The CEM module 2046 includes stored data values, constants, and functions, as well as operating instructions stored on, for example, a computer readable medium. Any of the operations of exemplary procedures described herein may be performed at least partially by the CEM module 2046. In certain embodiments, the controller includes one or more modules structured to functionally execute the operations of the controller. The description herein including modules emphasizes the structural independence of the aspects of the CEM module 2046, and illustrates one grouping of operations and responsibilities of the CEM module 2046. Other groupings that execute similar overall operations are understood within the scope of the present application. Modules may be implemented in hardware and/or instructions on computer readable medium, and modules may be distributed across various hardware or computer readable medium components. More specific descriptions of certain embodiments of controller operations are included in the section referencing FIG. 13. Operations illustrated are understood to be exemplary only, and operations may be combined or divided, and added or removed, as well as re-ordered in whole or part, unless stated explicitly to the contrary herein.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 13:
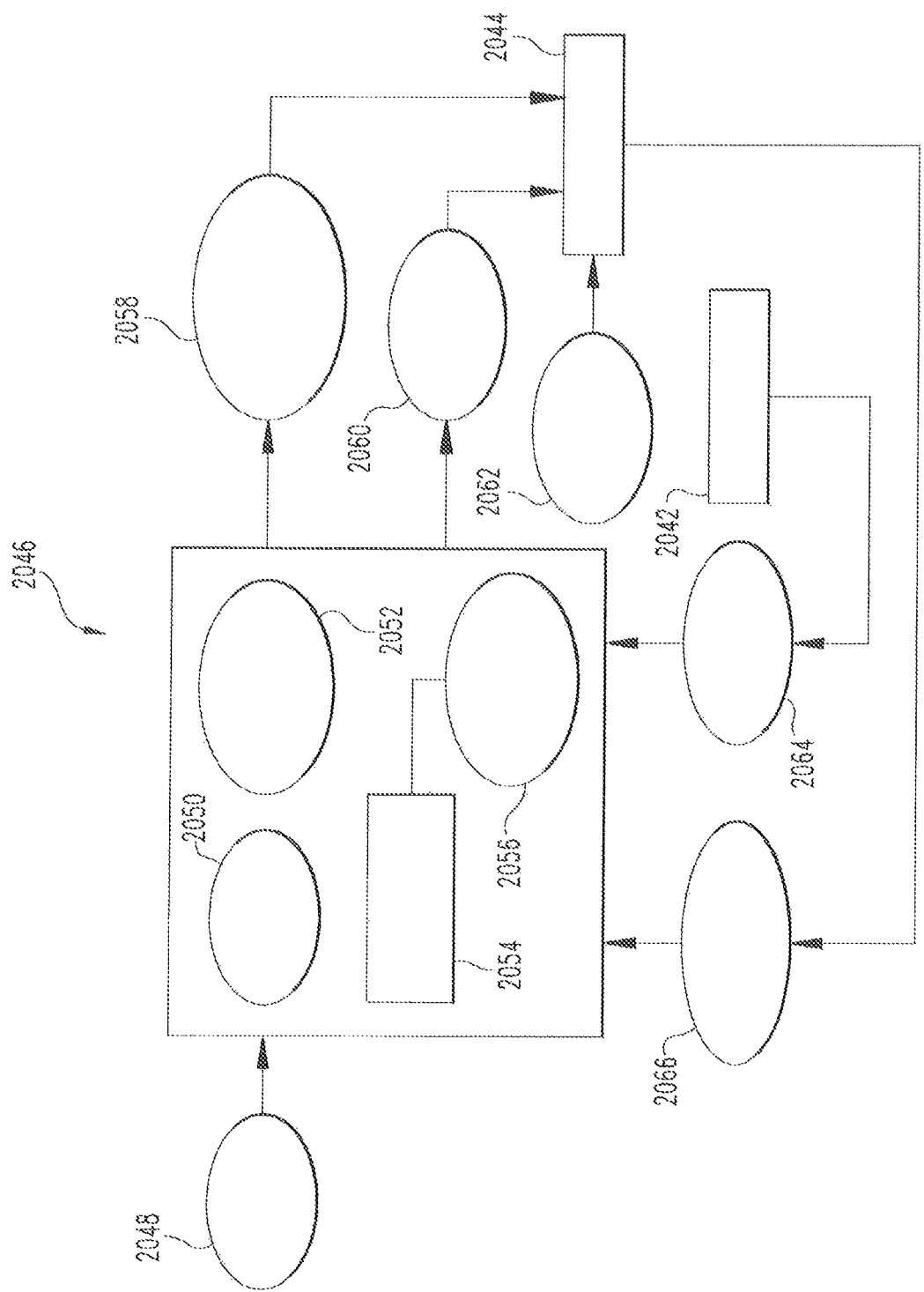
FIG. 13 is a schematic illustration of a controller for coasting management of a vehicle.

One exemplary embodiment of CEM module 2046 is shown in FIG. 13. The CEM module 2046 may include an engine fueling map 2050, an engine braking/friction map 2052, and a coasting management module 2054, among other modules. Example other modules include an operations cost module, a vehicle speed management module, a fuel quantity management module, a transient torque management module, a transmission arbiter module, a cruise control arbiter module, a throttle arbiter module, and an operator override module. Other arrangements that functionally execute the operations of the CEM module 2046 are contemplated in the present application. For example, additional CEM module and cruise control operation aspects with which the present invention may have application may be found with reference to U.S. Provisional Application Ser. No. 61/941,850 filed on Feb. 19, 2014 which is a priority document to U.S. Patent Application Publication No. 2015-0239454 A1, as well as U.S. patent application Ser. No. 14/261,010 filed on Apr. 24, 2014 and published as U.S. Patent Application Publication No. 2015-0306957 A1, each of which is incorporated herein by reference for all purposes.

In certain embodiments, the CEM module 2046 receives operating inputs 2048, such as a fuel amount input, a weather conditions input from one or more sensors and/or one or more external devices for detecting weather conditions, and a route conditions input from one or more sensors and/or one or more external devices for detecting route conditions. The fuel amount may include the amount of fuel remaining in the fuel tank. The weather conditions may include a humidity level, a wind condition, and a precipitation condition. The route conditions may include a trip distance, an elevation profile, a route grade profile, a grade length, a maximum speed limit, a minimum speed limit, a traffic condition, and a road condition.

The CEM module 2046 illustrated in FIG. 13 includes engine conditions 2064 input from the ECU 2042 and transmission conditions 2066 input from the TCU 2044. In certain embodiments, the engine conditions 2064 and transmission conditions 2066 may be determined from a plurality of sensors positioned throughout vehicle 2002. Engine conditions 2064 may include a brake actuation parameter, a throttle position parameter, a torque request parameter, an ambient air pressure, an ambient air temperature, an engine temperature, an engine torque, an engine speed, an engine speed rate of change, an engine degrade state, and a brake position. Transmission conditions 2066 may include a transmission gear ratio, a current transmission gear, a final drive ratio, a clutch actuator position, and a neutral gear state.

In operation, CEM module 2046 is a tool based on a series of operation control modules that provide both anticipated and currently desired vehicle 2002 operation behavior to optimize fuel economy. The series of operation control modules are focused on the components of vehicle 2002, and more specifically the components of powertrain 2004. For a given travel route and one or more route constraints, the recommendations or outputs made by the CEM module 2046 is dependent on the operating inputs 2048, engine conditions 2064, transmission conditions 2066, the engine fueling map 2050 and the engine braking/friction map 2052. Maps 2050, 2052 may be in the form of multidimensional performance maps, or lookup tables, calibrated offline and provided by the engine manufacturer. It is contemplated that in certain embodiments the engine braking/friction map 2052 may be obtained from the engine fueling map 2050, while in others the engine fueling map 2050 may be obtained from the engine braking/friction map 2052.

CEM module 2046 is operable to assume active control of the vehicle 2002, regulating a vehicle speed, the engine torque curve, and/or other powertrain 2004 operating conditions to ensure optimal vehicle 2002 operation, or passive control which allows the operator to take recommended actions. In the present application, CEM module 2046 includes coasting management module 2054 operable to interpret operating inputs 2048, engine conditions 2064, and transmission conditions 2066 to determine a coasting opportunity 2056 is available, and to automatically (without operator input) disconnect the engine 2006 from the driveline 2012 in a vehicle with a transmission 2010 to enable coasting of vehicle 2002 to obtain, for example, fuel economy benefits.

In response to coasting management module 2054 interpreting or receiving an input that a coasting opportunity is available for vehicle 2002 or desired, CEM module 2046 outputs, in a first embodiment, a transmission gear command or request 2058 to TCU 2044 or, in a second embodiment, a clutch actuator command or request 2060 to TCU 2044. It will be appreciated herein that use of the term "command" can also include "or request", and vice versa, unless indicated to the contrary. In some embodiments a gear or clutch "command" may more properly be referred to as a "request". For example, a request may be sent to the transmission control unit and the TCU makes a decision as whether to honor the request or not based upon a number of conditions. Transmission gear command or request 2058 and clutch actuator command or request 2060 each disengage engine 2006 from driveline 2012 in response to coasting opportunity 2056 to provide coasting operation of vehicle 2002.

In one embodiment, transmission gear command or request 2058 controls an actuator 2032 (shown in FIG. 12 as located within the contours of the transmission 2010, but it will be appreciated that the actuator 2032 can be located elsewhere) that actuates transmission 2010 to achieve a neutral gear position to disconnect engine 2006 from driveline 2012. In another embodiment, clutch actuator command or request 2060 actuates a clutch actuator 2020 associated with clutch 2016 to disengage clutch 2016 and disconnect engine 2006 from driveline 2012. Transmission 1 gear command or request 2058 or clutch actuator command or request 2060 can be activated by CEM module 2046 during cruise control operation of vehicle 2002, or anytime when CEM module 2046 is active for controlling operations of vehicle 2002 in response to certain conditions. Transmission gear command or request 2058 or clutch actuator command or request 2060 can be overridden by operator input 2062, such as when the operator increases the throttle position, pushes a brake pedal, or moves a gear level, to re-engage engine 2006 to driveline 2012 and terminate coasting operation of vehicle 2002.

In one embodiment, the transmission gear command or request 2058 is an actuator that achieves a neutral position of the transmission 2010 by using a range shift or split shift cylinder to obtain the neutral position. Although not explicitly shown in the figures, it will be appreciated by those in the technical field that either the range shift or split shift cylinder can be located within the contours of the transmission 2010 or elsewhere. To set forth one non-limiting example, one or more components of either the range or split shift can be located in an auxiliary housing, such as but not limiting to an auxiliary housing located between the transmission 2010 and the drive shaft 2014. A splitter that is typically used for a transmission is actuated by actuator 2032 to move between high and low split positions so that a neutral position is obtained. In another embodiment, the actuator 2032 arranges the splitter so that when fully engaged to the high or low position, a neutral position is obtained since no gear meshes are connected to an output shaft of transmission 2010, such as drive shaft 2014. In yet another embodiment, a range shift is configured to select neutral in response to the transmission gear command or request 2058. Transmission 2010 can be configured so that actuation to the neutral position is obtained without clutch actuation, such as currently performed in shifting between top gears of some currently available transmissions.

Although as discussed above the CEM module 2046 can be structured to output a command or request to disengage the engine 2006 from the driveline 2012 in response to a coasting opportunity, the CEM module 2046 can also be structured to monitor performance of the vehicle 2002 and re-engage the engine 2006 to the driveline 2012 when conditions warrant. Such re-engagement can occur when vehicle speed exceeds a threshold, the condition of which can be monitored by the CEM 2046 or other suitable module during the coasting event.

Figure 14:
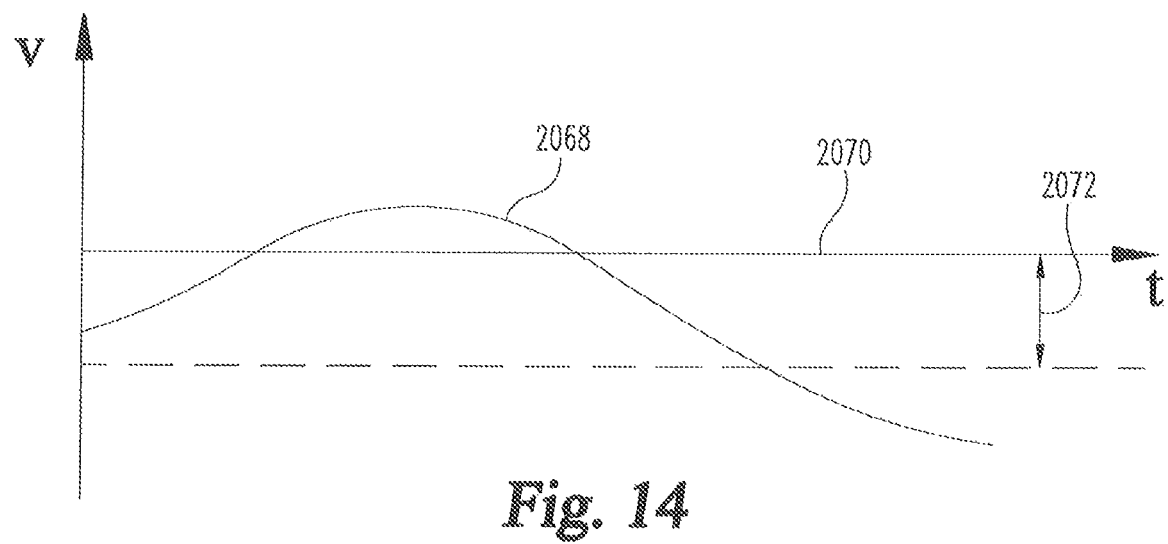
FIG. 14 is a schematic illustration of vehicle speed variations and a cancel delta threshold.

FIG. 14 depicts an illustration of velocity 2068 as it naturally diverges from the isochronous speed 2070 as a result of disturbances such as road conditions, wind, vehicle drafting, etc. In this non-limiting embodiment the CEM module 2046 is in active control of the vehicle 2002 and the isochronous speed 2070 represents a cruise control set speed of the controller that is set by a driver. The embodiments disclosed and discussed in FIGS. 15-17 as included in the CEM 2046 can alternatively be incorporated into any form which embodies and/or includes the coasting management controller disclosed and described in FIGS. 10-11, and vice versa.

A cancel delta threshold 2072 is shown below the isochronous speed 2070 and it represents a delta speed divergence from the isochronous speed 2070 at which point the CEM 2046 re-engages the engine 2006 to the driveline 2012. Such a situation might occur when a coasting vehicle encounters a road grade that is level, that is rising, or that is insufficiently steep. These situations may occur at the end of a long grade, but may also occur mid grade in which a local rise in terrain results in a reduction in vehicle speed. Although the cancel delta threshold 2072 is shown as a constant in the illustration in FIG. 14, the cancel delta threshold 2072 can be implemented in a number of different manners as described further below.

Figure 15:
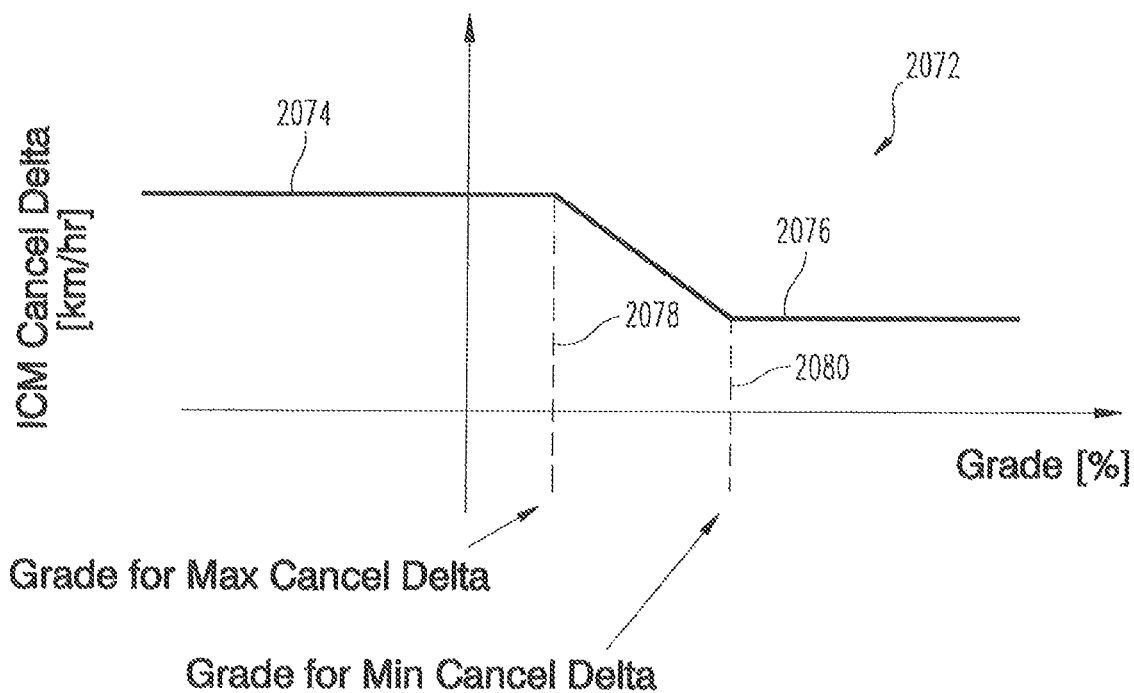
FIG. 15 depicts one embodiment of a cancel delta.

Turning now to FIG. 15, one embodiment of the cancel delta threshold 2072 is shown which has been implemented as a function of grade of terrain (which can be measured or can be from the route grade profile). At low grades the cancel delta 2072 has a maximum value 2074, while at higher grades the cancel delta 2072 has a minimum value 2076. The cancel delta 2072 transitions from the maximum value 2074 to the minimum value 2076 at a first grade 2078, and completes the transition from maximum value 2074 to minimum value 2076 at a second grade 2080. The transition from maximum value 2074 to minimum value 2076 can be implemented as a straight-line in which intermediate values can be determined through linear interpolation. Other implementations are also contemplated.

The selection of maximum and minimum values of the cancel delta, as well as the particular grades at which the transitions occur, can be found through a number of techniques. For example, a given route having known terrain features can be studied to determine appropriate values for each. In other settings a Design of Experiments can be run using a number of separate simulations to determine (e.g. through the use of regression analysis) which values of the maximum, minimum, and transition points are appropriate to achieve adequate performance. In one non-limiting form the max cancel delta can be 3 mph, with the minimum cancel delta at 1.24 mph.

The maximum cancel delta 2074 implemented in FIG. 15 permits a relatively wider variation in vehicle speed in situations in which the vehicle encounters an intermediate rise in terrain on an otherwise longer downhill stretch. The relatively wider variation will assist in keeping the engine 2006 disengaged from the driveline 2012 for a coasting event when these intermediate rises in terrain are followed by a continued downhill coasting event.

On the other side of the cancel delta profile shown in FIG. 15, the minimum cancel delta 2076 seeks to re-engage the engine 2006 to the driveline 2012 in the presence of smaller variations from isochronous speed 2070. For example, a steep rise in terrain will result in rapid reduction in speed and thus quicker re-engagement of the engine 2006 to the driveline 2012 may be desired to avoid excessively low speeds at the re-engagement.

Figure 16:
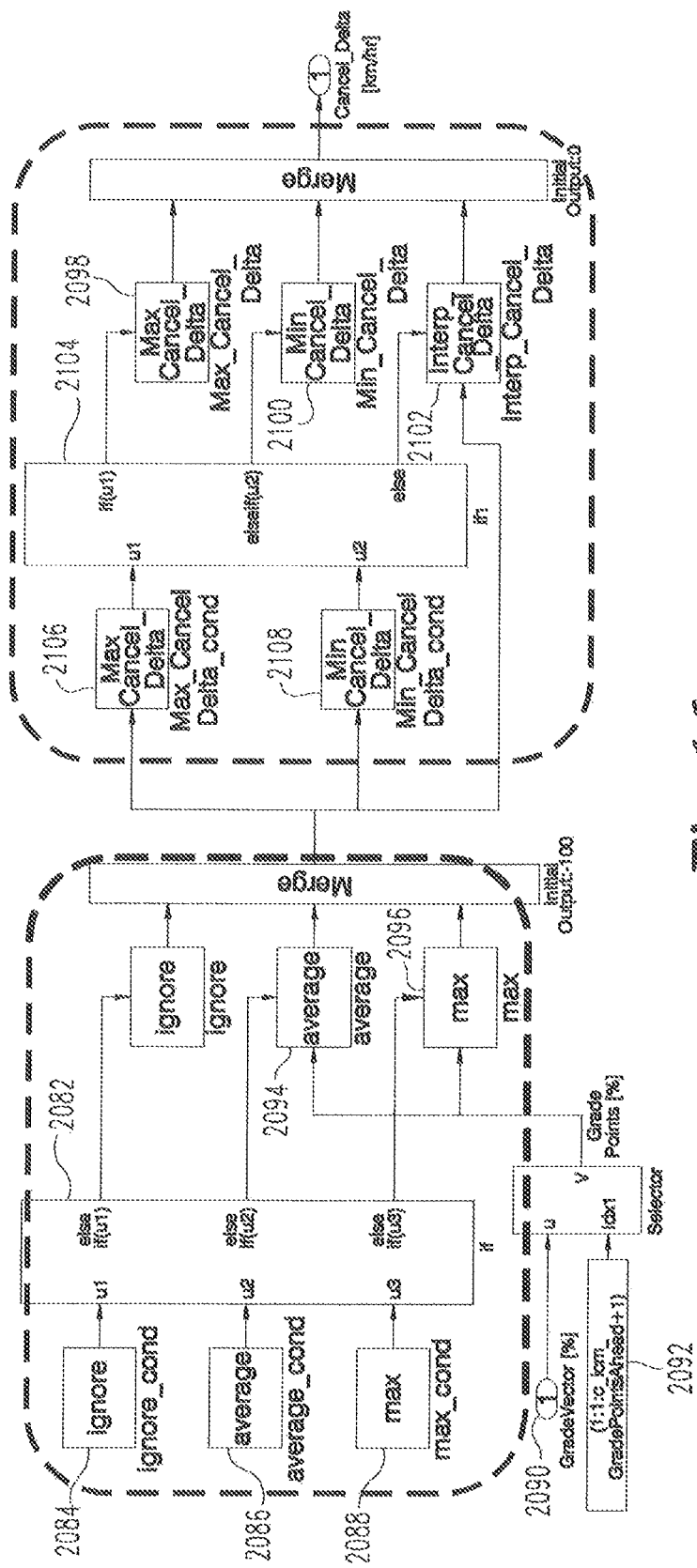
FIG. 16 depicts one embodiment of a conditional blog diagram set.

The cancel delta 2072 profile shown as a function of grade in FIG. 15 can be implemented in a variety of manners. In one non-limiting embodiment, the cancel delta 2072 profile can be implemented in a look-up table (LUT), but in other forms the profile can be implemented via a set of conditional statements, among other possibilities. FIG. 16 depicts an embodiment in which the cancel delta 2072 profile is implemented as a set of conditional statements. A set of signals are provided to a conditional 2082 to determine whether to ignore 2084 the conditional 2082, find an average grade 2086 of a vector of grade points (e.g. from the route grade profile), or find a maximum grade 2088 of the vector of grade points. A grade vector 2090 is provided along with a selector 2092 which determines how many points of the grade vector 2090 to utilize. Once the number of points from the grade vector 2090 are selected, the data is then provided to either a function that averages 2094 or finds the maximum 2096 of the vector. Depending on whether the grade information can be ignored, or whether the data should be averaged or the maximum determined, said data is then passed to a routine that calculates the value of the cancel delta.

Shown on the right side of FIG. 16 is a conditional block diagram that determines, based on the grade provided by the left side of FIG. 16, whether the cancel delta 2072 should be set at the maximum 2098, the minimum 2100, or whether interpolation 2102 is required. The center conditional 2104 operates on basis of receiving values from either the max condition 2106 function structured to determine whether the max cancel delta should be used based on grade, or the min condition 2108 structured to determine whether the min cancel delta should be used based on grade. If neither of those conditions are met, the center conditional 2104 directs that the interpolation function 2102 should be used.

Figure 17:
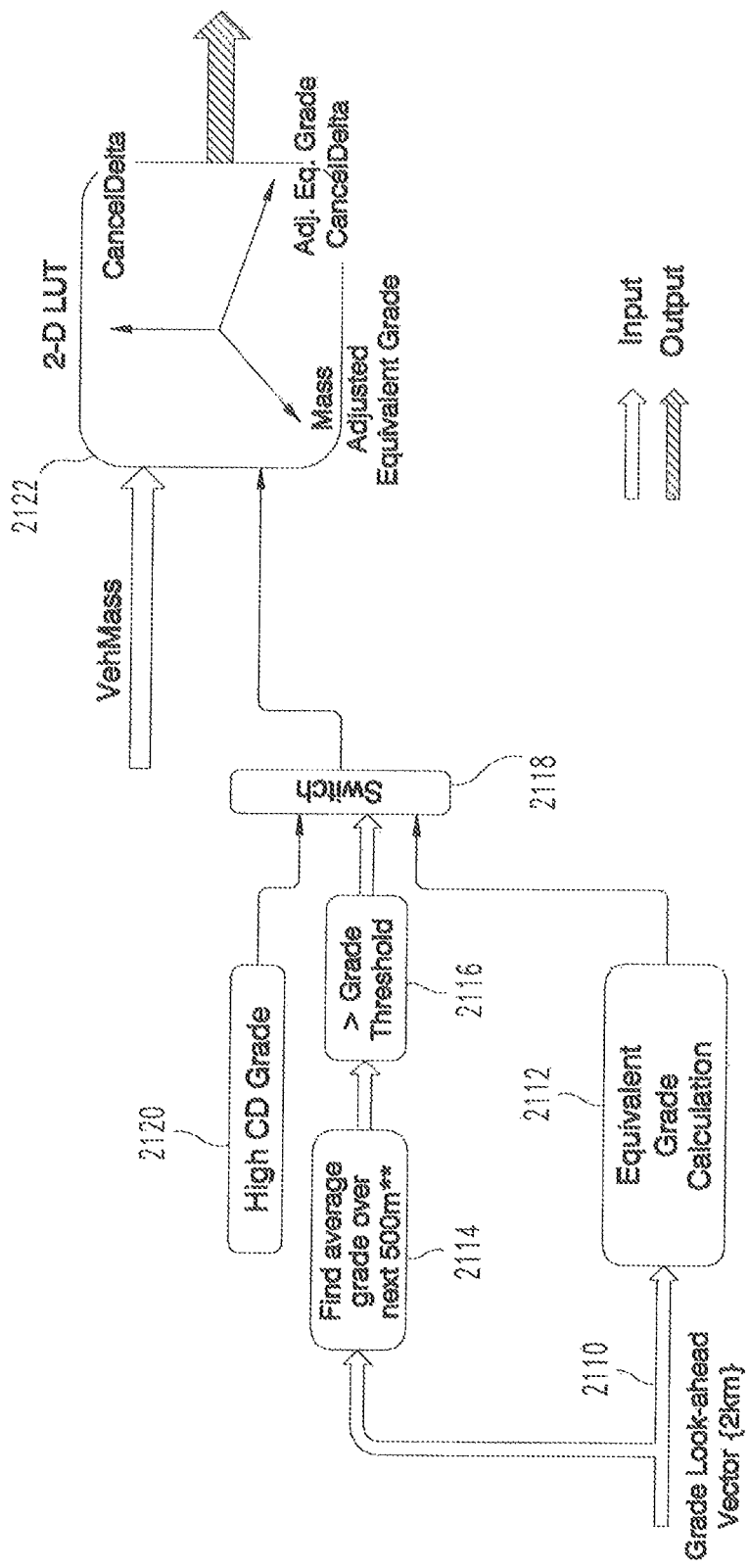
FIG. 17 depicts another embodiment of a cancel delta.

FIG. 17 depicts yet another embodiment of the cancel delta 2072 which uses a combination of different sized windows of grade look-aheads. A grade look ahead vector 2110 is provided to a procedure 2112 which determines an equivalent grade of the vector 2110, and a near horizon procedure 2114 which determines the average grade over a smaller subset, typically the near distance subset, of the grade look ahead vector 2110. In one form the grade look ahead vector 2110 is 2 kilometer look-ahead vector, and the procedure 2114 examines merely the first 2108 m of the look-ahead vector. The equivalent grade procedure 2112 can take on any variety of forms, including an average of all datapoints.

The near horizon feature 2114 provides information to a conditional 2116 which determines whether the near horizon average grade meets a threshold conditional requirement. The conditional 2116 can be implemented such that it is satisfied if the near horizon average grade is greater than a threshold, but in other forms it can be implemented as an equal to or greater than condition.

Information from the conditional 2116 is provided to switch 2118 to determine whether the equivalent grade from procedure 2112 over the entire grade look ahead vector 2110 is ultimately passed to other procedures, or whether the near horizon average grade from procedure 2114 is used. If the near horizon average grade from procedure 2114 meets the condition of conditional 2116, then a high cancel delta 2120 is used. Otherwise, a two-dimensional (2-D) LUT is used to determine the appropriate cancel delta.

As shown in block 2122, a 2-D LUT has as inputs the vehicle mass as well as an adjusted equivalent grade which can be information from procedure 2112. The 2-D LUT can have cross sections of cancel delta v. grade similar to that shown above in FIG. 15. The high cancel delta 2120 can be the same as a maximum cancel delta from any particular cross section of cancel delta v. grade.

An aspect of the present application provides a method comprising: operating a vehicle having an engine and a coasting management controller structured to disengage the engine from a driveline to allow a coasting event, computationally predicting a speed change of the vehicle as a result of an upcoming road condition upon which the vehicle is travelling, and requesting disengagement of the engine from the driveline if predicted speed change remains within a limit.

A feature of the present application provides wherein the limit is a calibratible threshold over a calibratible distance.

Another feature of the present application provides wherein the predicting a speed change occurs at a number of points in a window which includes upcoming terrain.

Still another feature of the present application further includes checking each point in the window against a limit.

Yet another feature of the present application provides wherein the number of points are regularly spaced in the window, and wherein the requesting disengagement of the engine includes inhibiting a signal that requests disengagement when the predicted speed change falls outside of the limit.

Still yet another feature of the present application further includes a persistence counter such that the requesting disengagement occurs after a time period has elapsed as a result of a persistence counter determining that predicted speed change remains within the limit.

Another aspect of the present application provides an apparatus comprising: a coasting management controller for a vehicle having an engine structured to provide motive power to the vehicle, the coasting management controller structured to: predict a future speed of the vehicle based upon a look-ahead road condition, and request disengagement of the engine from the driveline if predicted speed change remains within a speed limit.

A feature of the present application provides wherein the coasting management controller is structured to query the speed limit from a calibration table.

Another feature of the present application provides wherein future speed is determined at a number of discrete points within a window, the window including information of upcoming road grade.

Still another feature of the present application provides wherein the coasting management controller is structured to evaluate each point in the window against the limit.

Yet another feature of the present application provides wherein the limit is a fixed value over the entire window.

Still yet another feature of the present application provides wherein the controller further includes a persistence counter and a persistence threshold, the persistence counter counts the number of frames that the future speed remains within the limit, and wherein the controller is structured to delay the request for disengagement until the number of frames counted by the persistence counter meets the persistence threshold.

Yet another aspect of the present application provides an apparatus comprising: a vehicle having an internal combustion engine structured to provide motive power to a driveline, and a coasting management controller configured to regulate engagement of the engine with the driveline to allow for a coasting event, the coasting control system having a speed estimator structured to predict a future speed of the vehicle in light of upcoming road conditions, the coasting control system structured to request disengagement of the engine from the driveline if future speed remains within a speed limit.

A feature of the present application further includes a table that includes a plurality of values of limits from which the speed limit is determined, and wherein the coasting management controller is structured to query the speed limit from a calibration table.

Another feature of the present application provides wherein future speed is determined at a number of discrete points along a distance in front of the vehicle, the discrete points including information of upcoming road grade.

Still another feature of the present application provides wherein the coasting management controller is structured to evaluate each point in the window against the limit.

Yet another feature of the present application provides wherein the speed limit is a fixed value over the entire window.

Still yet another feature of the present application provides wherein the controller further includes a persistence counter and a persistence threshold, the persistence counter counts the number of frames that the future speed remains within the limit, and wherein the controller is structured to delay the request for disengagement until the number of frames counted by the persistence counter meets the persistence threshold.

Yet still another feature of the present application provides wherein the discrete points are evenly spaced.

A further feature of the present application provides wherein the discrete points are unevenly spaced.

An aspect of the present application includes a method comprising operating a vehicle including an engine that is disconnected to a driveline, monitoring speed of the vehicle and grade of terrain upon which the vehicle is operated through use of a vehicle speed controller, the vehicle speed controller structured to maintain disconnection of the engine from the driveline during a coasting event subject to a cancellation threshold speed beyond a desired speed in which the engine will be re-connected to the driveline, using grade of terrain in the vehicle speed controller to determine the cancellation threshold from a function that depends upon the grade of terrain, and comparing speed of the vehicle against the cancellation threshold to determine whether to re-connect the engine to the driveline.

A feature of the present application includes wherein the desired speed is a set speed of the vehicle speed controller, and wherein the cancellation threshold is a cancellation delta applied to a set speed of the vehicle speed controller.

Another feature of the present application includes wherein the cancellation threshold is determined from a cancel delta function that provides large cancellation threshold result at low grade and small cancellation threshold result at high grade.

Still another feature of the present application includes wherein the cancel delta function is based on a look ahead window having a first size, and which further includes a switch structured to operate on a basis of a grade information determined from a look ahead window having a second size smaller than the first size.

Yet another feature of the present application includes wherein the switch determines whether the cancellation threshold is determined from the cancel delta function or is a constant, the switch operated on the basis of comparing the grade information from the look ahead window having the second size against a threshold grade.

Still yet another feature of the present application includes wherein the cancellation threshold is determined from the function when the grade information from the look ahead window having the second size is below a threshold grade value.

Yet still another feature of the present application includes wherein the constant is a first constant value, wherein a value of the cancel delta function is a first function value, and wherein the first constant value is larger than the first function value.

A yet further feature of the present application includes wherein the cancel delta function is a function of grade information and vehicle mass.

Another aspect of the present application includes an apparatus comprising a speed based controller for a vehicle having a motor used to provide motive power to a driveline of the vehicle, the speed based controller structured to: issue a command to disconnect the driveline from the engine to begin a coasting event, monitor speed of the vehicle and grade of terrain upon which the vehicle is operated through use of a vehicle speed controller, and utilize the grade of terrain upon which the vehicle is operating to determine a cancel delta which represents a divergence speed from a set speed of the speed based controller within which the engine will remain disconnected from the driveline, but beyond which the engine is reconnected to the driveline.

A feature of the present application includes wherein the speed based controller includes a cancel delta function which provides the cancel delta, the cancel delta function structured to determine a value of the cancel delta upon receipt of the grade of terrain upon which the vehicle is operated.

Another feature of the present application includes wherein the cancel delta function provides a maximum value at a low grade, a minimum value at a high grade, and a linearly interpolated value between the maximum and minimum when at an intermediate grade between the low grade and the high grade.

Still another feature of the present application includes wherein the cancel delta function utilizes grade information determined from a switch, the switch structured to evaluate whether average grade in a look ahead window exceeds a pre-determined value.

Yet another feature of the present application includes wherein the switch determines whether the grade of terrain used in the cancel delta function is an average grade of a look ahead window for use in the cancel delta function or if a pre-determined value of the cancel delta is used.

Still yet another feature of the present application includes wherein the cancel delta function is a function of grade information and vehicle mass.

Yet another aspect of the present application includes an apparatus comprising a vehicle having an engine in selective engagement with a driveline, the engine providing power through the driveline to propel the vehicle when the engine is engaged with the driveline, a vehicle cruise control system configured to disengage the engine from the driveline during a coasting event, and to re-engage the engine with the driveline when a speed of the vehicle breaches a cancel delta threshold applied to a set speed of the vehicle cruise control system, the cancel delta threshold determined by providing a grade of terrain to a routine that calculates the cancel delta threshold as a function of grade of terrain.

A feature of the present application includes wherein the function used to calculate the cancel delta threshold is structured as a function of both grade of terrain and vehicle mass.

Another feature of the present application includes wherein the function is structured as a maximum value at a first grade value, a minimum value at a second grade value higher than the first grade value, and an interpolated value at a grade value intermediate the first grade value and the second grade value.

Still another feature of the present application includes wherein a switch determines the value of the grade of terrain based upon an average grade value of a look ahead vector of grade values.

Yet another feature of the present application includes wherein the switch selects a pre-determined constant value of the cancel delta threshold if the average grade value of a first look ahead vector of grade values exceeds a switch value.

Still yet another feature of the present application includes wherein the switch selects an average grade value of a second look ahead vector of grade values when the average grade value of a first look ahead vector is less than a switch value, the first look ahead vector of grade values is structured to look ahead a shorter distance than the second look ahead vector of grade values.

It should be understood that while the use of words such as preferable, preferably, preferred or more preferred if utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a vehicle including an engine that is disconnected to a driveline;
   monitoring a speed of the vehicle and a grade of terrain upon which the vehicle is operated through use of a vehicle speed controller, the vehicle speed controller structured to maintain disconnection of the engine from the driveline during a coasting event subject to a cancellation threshold beyond a desired speed in which the engine will be re-connected to the driveline;
   using the grade of terrain in the vehicle speed controller to determine the cancellation threshold from a function that depends upon the grade of terrain; and
   comparing the speed of the vehicle against the cancellation threshold to determine whether to re-connect the engine to the driveline; and
   reconnecting the engine to the drive line in response to the comparing determining the cancellation threshold is exceeded.

2. The method of claim 1, wherein the desired speed is a set speed of the vehicle speed controller, and wherein the cancellation threshold is a cancellation delta applied to a set speed of the vehicle speed controller.

3. The method of claim 2, wherein the cancellation threshold is determined from a cancel delta function that provides large cancellation threshold result at low grade and small cancellation threshold result at high grade.

4. The method of claim 3, wherein the cancel delta function is based on a look ahead window having a first size, and which further includes a switch structured to operate on a basis of a grade information determined from a look ahead window having a second size smaller than the first size.

5. The method of claim 4, wherein the switch determines whether the cancellation threshold is determined from the cancel delta function or is a constant, the switch operated on the basis of comparing the grade information from the look ahead window having the second size against a threshold grade.

6. The method of claim 5, wherein the cancellation threshold is determined from the function when the grade information from the look ahead window having the second size is below a threshold grade value.

7. The method of claim 6, wherein the constant is a first constant value, wherein a value of the cancel delta function is a first function value, and wherein the first constant value is larger than the first function value.

8. The method of claim 7, wherein the cancel delta function is a function of grade information and vehicle mass.

9. An apparatus comprising:
   a speed based controller for a vehicle having an engine used to provide motive power to a driveline of the vehicle, the speed based controller structured to:
   issue a command to disconnect the driveline from the engine to begin a coasting event;
   monitor a speed of the vehicle and a grade of terrain upon which the vehicle is operated through use of a vehicle speed controller;
   utilize the grade of terrain upon which the vehicle is operating to determine a cancel delta which represents a divergence speed from a set speed of the speed based controller within which the engine will remain disconnected from the driveline, but beyond which the engine is reconnected to the driveline; and
   engage the engine to the driveline in response to the cancel delta being exceeded.

10. The apparatus of claim 9, wherein the speed based controller includes a cancel delta function which provides the cancel delta, the cancel delta function structured to determine a value of the cancel delta upon receipt of the grade of terrain upon which the vehicle is operated.

11. The apparatus of claim 10, wherein the cancel delta function provides a maximum value at a low grade, a minimum value at a high grade, and a linearly interpolated value between the maximum and minimum when at an intermediate grade between the low grade and the high grade.

12. The apparatus of claim 10, wherein the cancel delta function utilizes grade information determined from a switch, the switch structured to evaluate whether average grade in a look ahead window exceeds a pre-determined value.

13. The apparatus of claim 12, wherein the switch determines whether the grade of terrain used in the cancel delta function is an average grade of a look ahead window for use in the cancel delta function or if a pre-determined value of the cancel delta is used.

14. The apparatus of claim 10, wherein the cancel delta function is a function of grade information and vehicle mass.

15. An apparatus comprising:
a vehicle having an engine in selective engagement with a driveline, the engine providing power through the driveline to propel the vehicle when the engine is engaged with the driveline; and
a vehicle cruise control system configured to disengage the engine from the driveline during a coasting event, and to re-engage the engine with the driveline when a speed of the vehicle breaches a cancel delta threshold applied to a set speed of the vehicle cruise control system, the cancel delta threshold determined by providing a grade of terrain to a routine that calculates the cancel delta threshold as a function of the grade of terrain.

16. The apparatus of claim 15, wherein the function used to calculate the cancel delta threshold is structured as a function of both the grade of terrain and vehicle mass.

17. The apparatus of claim 15, wherein the function is structured as a maximum value at a first grade value, a minimum value at a second grade value higher than the first grade value, and an interpolated value at a grade value intermediate the first grade value and the second grade value.

18. The apparatus of claim 15, wherein a switch determines the value of the grade of terrain based upon an average grade value of a look ahead vector of grade values.

19. The apparatus of claim 18, wherein the switch selects a pre-determined constant value of the cancel delta threshold if the average grade value of a first look ahead vector of grade values exceeds a switch value.

20. The apparatus of claim 19, wherein the switch selects an average grade value of a second look ahead vector of grade values when the average grade value of a first look ahead vector is less than a switch value, the first look ahead vector of grade values is structured to look ahead a shorter distance than the second look ahead vector of grade values.

* * * * *